(12) United States Patent  (10) Patent No.: US 8,165,279 B2
Nakamura et al.  (45) Date of Patent: Apr. 24, 2012

(54) MANAGEMENT SERVER FOR TELECONFERENCE SYSTEM AND COMPUTER PROGRAM

(75) Inventors: Shinichiro Nakamura, Chiyoda-ku (JP); Satoshi Kaneko, Chiyoda-ku (JP)

(73) Assignee: Commitment Technologies Inc., Tokyo (JP)

( * ) Notice: Subject to any disclaimer, the term of this patent is extended or adjusted under 35 U.S.C. 154(b) by 420 days.

(21) Appl. No.: 12/516,114

(22) PCT Filed: Nov. 16, 2007

(86) PCT No.: PCT/JP2007/072325
§ 371 (c)(1), (2), (4) Date: May 22, 2009

(87) PCT Pub. No.: WO2008/062738
PCT Pub. Date: May 29, 2008

(65) Prior Publication Data
US 2010/0061537 A1  Mar. 11, 2010

(30) Foreign Application Priority Data

Nov. 22, 2006 (JP) ................................. 2006-315112
Aug. 1, 2007 (JP) ................................. 2007-200294

(51) Int. Cl.
*H04M 3/42* (2006.01)

(52) U.S. Cl. .......... 379/202.01; 379/203.01; 379/204.01

(58) Field of Classification Search ............. 379/202.01, 379/201.01, 203.01, 204.01, 205.01, 206.01
See application file for complete search history.

(56) References Cited

U.S. PATENT DOCUMENTS 6,606,479 B2 * 8/2003 Cook et al. .................... 434/350
7,328,243 B2 * 2/2008 Yeager et al. ................. 709/205

FOREIGN PATENT DOCUMENTS

| JP | 1 316874 | 12/1989 |
| JP | 7 182350 | 7/1995 |
| JP | 2002 223252 | 8/2002 |
| JP | 2004 94834 | 3/2004 |
| JP | 2004 151804 | 5/2004 |

* cited by examiner

*Primary Examiner* — Thjuan K Addy
(74) *Attorney, Agent, or Firm* — Oblon, Spivak, McClelland, Maier & Neustadt, L.L.P.

(57) ABSTRACT

Provided is a teleconference system enabling easy participation in a conference from a place geographically apart, securing active proceeding by individual presenting of statement, and enabling drastic decrease of trouble of creating a result by the conference. Statement information inputted by an input means of a terminal device is received and temporarily held and then the received statement information is transmitted to all the terminal devices participating in a teleconference. The statement information displayed on a display means of the terminal device is sorted by an input means of the terminal device and received as statement attribute data. The received statement attribute data and the statement information are stored in an information database. Then, based on the statement attribute data and the statement information, a commitment related to the teleconference is generated.

16 Claims, 25 Drawing Sheets

02-09/EXTRACTION OF PROBLEM/PARTICIPANT'S SCREEN

CONFERENCE PARTICIPANTS
- TARO PARTICIPATING
- JIRO PARTICIPATING
- SABURO PARTICIPATING
- SHIRO PARTICIPATING
- GORO PARTICIPATING
- ROKURO PARTICIPATING
- SHICHIRO PARTICIPATING

CONFERENCE PROCEEDING
- CONFERENCE PREPARATION
- SUBMISSION OF PROBLEM
- PROBLEM DEFINITION
- CONFIRMATION OF STATUS
- PRESENTATION OF SOLUTION
- AGREEMENT CREATION

EXTRACTION OF PROBLEM

PROBLEMS THOUGHT BY PARTICIPANTS

| 8 VOTES | · TARO | HOW CAN I ●×△▼･?|
| 6 VOTES | · TARO | HOW CAN I ●×△▼･?|
| 6 VOTES | · JIRO | HOW CAN I ●×△▼･?|
| 3 VOTES | · JIRO | HOW CAN I ●×△▼･?|
| 0 VOTE | · SABURO | HOW CAN I ●×△▼･?|
| 0 VOTE | · SHIRO | HOW CAN I ●×△▼･?|
| 0 VOTE | · SHIRO | HOW CAN I ●×△▼･?|
| 0 VOTE | · GORO | HOW CAN I ●×△▼･?|
| 0 VOTE | · ROKURO | HOW CAN I ●×△▼･?|
| 0 VOTE | · SHICHIRO | HOW CAN I ●×△▼･?|

INPUT FIELD

FIG. 24

02-10/EXTRACTION OF PROBLEM/CHAIRMAN'S SCREEN

CONFERENCE PARTICIPANTS
- TARO PARTICIPATING
- JIRO PARTICIPATING
- SABURO PARTICIPATING
- SHIRO PARTICIPATING
- GORO PARTICIPATING
- ROKURO PARTICIPATING
- SHICHIRO PARTICIPATING

CONFERENCE PROCEEDING
- CONFERENCE PREPARATION
- SUBMISSION OF PROBLEM
- PROBLEM DEFINITION
- CONFIRMATION OF STATUS
- PRESENTATION OF SOLUTION
- AGREEMENT CREATION

EXTRACTION OF PROBLEM

FROM WHICH PROBLEM DO YOU START PROBLEM SOLVING?

○ VOTE(S) · TARO HOW CAN I ●×△▼･?
○ VOTE(S) · TARO HOW CAN I ●×△▼･?
○ VOTE(S) · JIRO HOW CAN I ●×△▼･?
○ VOTE(S) · JIRO HOW CAN I ●×△▼･?
○ VOTE(S) · SABURO HOW CAN I ●×△▼･?
○ VOTE(S) · SHIRO HOW CAN I ●×△▼･?
○ VOTE(S) · SHIRO HOW CAN I ●×△▼･?
○ VOTE(S) · GORO HOW CAN I ●×△▼･?
○ VOTE(S) · ROKURO HOW CAN I ●×△▼･?
○ VOTE(S) · SHICHIRO HOW CAN I ●×△▼･?

DO YOU START THE PROBLEM SOLVING OF THE FOLLOWING?
· JIRO HOW CAN I ●×△▼･? [CONFIRMATION]

INPUT FIELD

06-01/COMMITMENT CREATION/CHAIRMAN'S SCREEN

COMMITMENT CREATION

DO YOU START "ADOPTION OF SOLUTION?"

INPUT FIELD

FIG. 38

06-02/COMMITMENT CREATION/CHAIRMAN'S SCREEN

COMMITMENT CREATION

PLEASE SELECT THE SOLUTIONS TO ADOPT FROM THE FOLLOWING LIST AND CLICK A COMMITMENT CREATION BUTTON.

- TARO      DO ●●
- TARO      PERFORM ●●
- JIRO      CHANGE TO ●●
- JIRO      ●×△▼∵ IS IN SHORT.
- SABURO    REPLACE ●×△∵
- SHIRO     ▼△◇
- SHIRO     ◇◆◆
- GORO      ○△◆
- ROKURO    ×××
- SHICHIRO  ○○○

INPUT FIELD

MANAGEMENT SERVER FOR TELECONFERENCE SYSTEM AND COMPUTER PROGRAM

TECHNICAL FIELD

The present invention relates to a management server for teleconference system and a computer program, and in particular to an information processing technology in which convenience of participants in a teleconference and language study is taken into consideration.

BACKGROUND ART

Conventionally, participants in a teleconference gather in the same place, write statement content on paper while thinking time is measured with a clock or the like, and speak while putting statement sheets on a white board or the like depending on a proceeding status. Thereafter, the statement sheets are merged, grouped, or chosen by the participants, whereby a future action is determined. Then, the statement sheets are typed with a personal computer to an electronic document, and a commitment is created as a result of the teleconference to be delivered to the participants.

Here, as a prior art concerning a teleconference, Japanese Patent Application Laid-open No. 2004-94834 is picked out.

This technology eliminates need for synchronous processings in respective information processing devices used by conference participants, and enables relations of information divergently created/provided by the respective information processing devices to be organized on the spot. A technology of a teleconference system thus enables effective information collection or information comprehension is disclosed (for example, see Patent Document 1).

Patent Document 1: Japanese Patent Application Laid-open No. 2004-94834

DISCLOSURE OF THE INVENTION

Problems to be Solved by the Invention

Meanwhile, some participants among participants in a conference come from a long distance. In such a case, travel time is long and time adjustment is necessary. Further, in proceeding of the conference, time measurement is performed by a clock or a stopwatch, and a chairman or the like who leads the conference is required to always care about checking thinking time of the participants.

Further, checking of whether or not all the participants write in statement sheets depends only on visual observation.

Therefore, the chairman bears heavy burden in proceeding of the conference.

Then, when minutes or the like are put in a writing document after the conference, the minutes or the like are sometimes typewritten by a person other than the participant. In such a case, it is quite hard to judge which participant has merged, grouped, or chosen the statement sheets, and creation of the document requires much time.

It should be noted that an effective means for solving the present problem is not described in the above-stated patent document, either.

Meanwhile, in a TV conference system or the like, which is widely known, though the problem of securing travel time of the participant from a long distance can be solved, the problem of controlling timing of the participant to speak or judging who has merged, grouped, or chosen the participant's statements is not solved.

An object of claim 1 to claim 5 is to provide a management server for teleconference system enabling easy participation in a conference even from a geographically long distance and drastically decreasing trouble of creating a result by the conference.

An object of claim 6 to claim 8 is to provide a management server for teleconference system enabling training of English or multiple languages through a teleconference, to lead to an improved skill of languages.

An object of claim 9 to claim 13 is to provide a computer program enabling easy participation in a conference even from a geographically long distance and drastically decreasing trouble of creating a result by the conference.

An object of claim 14 to claim 16 is to provide a computer program enabling training of English or multiple languages through a teleconference, to lead to an improved skill of languages.

Means for Solving the Problems (Claim 1)

The invention according to claim 1 provides a management server network-connected by a plurality of terminal devices related to participants participating in a teleconference and enabling information related to the teleconference to be displayed in each terminal device.

In other words, a management server for teleconference system having: a statement information receiving means for receiving statement information such as a problem concerning an agenda and a solution for that problem which are inputted from an input means of the terminal device; a statement information accumulating means for once accumulating the statement information received by the statement information receiving means without displaying the statement information in the terminal device of the participant temporarily; a statement information transmitting means for transmitting the statement information to all the terminal devices participating in the teleconference, when in accordance with a judgment of a chairman leading the teleconference an input means of the chairman's side terminal device of the chairman transmits a disclosure permission signal of the accumulated statement information; a statement attribute data receiving means for receiving statement attribute data from the statement information created by a certain participant's operation in each terminal device having received the statement information; an information database storing the statement attribute data received by the statement attribute data receiving means and the statement information; and a commitment generating means for generating a commitment related to the teleconference, based on the statement attribute data and the statement information stored in the information database.

(Explanation of Term)

"Statement information" is statement content such as an agenda, a problem, and a solution for the problem which is presented by the participant or the chairman participating in the teleconference. The statement information is displayed on a display, for example, with one statement being one block, and is stored in the information database together with a name of the participant or date and time information. Here, "one block" is one statement presented by the participant, the one statement being made movable on the display.

"Statement information accumulating means"" is a function provided so that the teleconference proceeds without the participant in the teleconference accessing another participant's opinion or statement. According to this function, since each participant is not influenced by another participant's opinion nor be able to access another participant's opinion, each participant is almost forced to have a time to consider the agenda of the conference by himself. Thus, eagerness in participating in the teleconference or seriousness is improved, so that more active exchange of opinions can be expected to be enhanced. It should be noted that the statement information accumulated here is temporarily accumulated and can be disclosed to the participants depending on a judgment of the chairman who leads the conference.

"Statement attribute data" is data sorted by a certain participant's merging, grouping, and choosing of the statement information. Merging means combining and blending the statement content displayed on the display means, grouping means connecting the statement content displayed on the display means to be one, and choosing means leaving or discarding the statement content displayed on the display means. That means, for example, in a case that a plurality of solutions are displayed for a problem, choosing what is necessary/unnecessary, or grouping the solutions belonging to the same solution. The statement attribute data is also stored in the information database together with the name of the participant and date and time information.

"Input means" is a keyboard, a mouse, and a microphone used for an audio input which are provided in the terminal device.

"Display means" is a display connected to the terminal device.

"Commitment" is a resolution and minutes determined in the teleconference. The resolution determined here is stored in the information database and the resolution is generated as digital data which is distributable to the conference participant.

(Functions)

The management server receives statement information such as the problem and the solution for the problem which are inputted by the input means of each terminal device.

When receiving the disclosure permission signal of the chairman's side terminal device, the management server transmits the statement information to all the terminal devices, so that the statement information is displayed as the statement block on the display means of each terminal device.

In the terminal device related to the participant, the statement information displayed on the display means is sorted or the like based on the participant's operation, so that the statement attribute data is created (for example, selection is done among three options of merging, grouping, and choosing). The statement attribute data created here is received by the management server.

Further, the management server stores the statement attribute data and the statement information in the information database.

The management server generates the commitment such as minutes determined in the teleconference, based on the statement attribute data and the statement information stored in the information database.

The present invention constructs a teleconference system by network-connecting a plurality of terminal devices. Since a connection mode by a network is taken, even if each geographic position of a participant related to each terminal device is physically apart, participation in a teleconference is not influenced.

Further, statement information such as a problem and a solution for that problem can be merged, grouped, and chosen on a display means and stored in an information database, so that trouble of judging merging, grouping and choosing with conventional statement sheets is not required. Thereby, a conference proceeds smoothly.

Besides, the statement information of the participant is temporarily accumulated and another participant's statement content is not accessible, so that each participant is not influenced by another participant's opinion and thinks of an agenda of the conference by himself. Thus, eagerness in participating in the teleconference or seriousness is improved, so that more active exchange of opinions can be expected to be enhanced.

Further, a person in charge of a commitment by the teleconference is determined among the participants, and minutes can be created from the data stored in the information database and distributed to the participants. Thus, a processing necessary after the conference can be performed during the conference, bringing convenience.

It should be noted that a network means an intranet or Internet. There are a WEB type (WEB server) in which a management server and terminal devices carry out a teleconference via an Internet connection, and a client-server type (application server) in which a management server and terminal devices carry out a teleconference via an intranet.

(Claim 2)

The invention according to claim 2 limits the management server for teleconference system according to claim 1.

In other words, the commitment generating means has a commitment creation request transmitting means for selecting a solution adopted as a commitment among solutions for the problem inputted by the input means of the terminal device and for requesting creation of the commitment of the terminal device having proposed the selected solution for the problem.

(Functions)

For the problem presented in the teleconference, each participant suggests his own solution without seeing another solution proposal. The chairman and the participant determine the good solution among those plural solutions.

As for the determined solution, the commitment creation request transmitting means transmits a creation request to the terminal device related to the participant having suggested the solution in order that the participant creates the commitment.

In the relevant terminal device, whether or not to accept that creation request can be selected by the participant who operates the relevant terminal device. Thereby, each participant can generate a commitment during the meeting of the teleconference, so that trouble of creating a commitment after the meeting as in an ordinary conference is not required.

(Claim 3)

The invention according to claim 3 limits the management server for teleconference system according to claim 1.

In other words, the management server for teleconference system has a questioning format transmitting means for receiving the problem inputted by the input means of the terminal device, and for converting the inputted problem into a predetermined questioning format to enable the terminal device to create a questioning document by using that questioning format.

(Functions)

Presume that the problem the participant has is "I presently go out on sales calls, and it takes much time to do paperwork after returning to the office" (Long time operation is a problem).

Ordinarily, such a sentence is often inputted in a form such as "It is hard as it takes time to do paperwork after returning to the office." If the questioning format of "How ~ ?" is transmitted and the above sentence is converted in accordance with that format, a sentence "How can I improve efficiency in paperwork time after returning to the office?" is brought.

If the problem is not in long time operation but in efficiency, the sentence can be converted into "How can I decrease time for paperwork after returning to the office?". In other words, by transmitting the form enabling conversion into the questioning format in advance, it becomes easier for the participant to write to present the problem.

(Claim 4)

The invention according to claim 4 limits the management server for teleconference system according to claim 3.

In other words, the management sever for teleconference system has a problem solution data receiving means for receiving problem solution data for solving the problem converted into the questioning format from the terminal device; a status confirmation judging means for judging which of a fact, an emotion and an opinion the received problem solution data is; and a correction input confirming means for asking whether to correct to the fact or the emotion when the problem solution data is judged to be the opinion by the status confirmation judging means.

(Functions)

The status confirmation judging means judges which of a fact, an emotion and an opinion of the participant the problem converted into the questioning format is. Here, if the problem is judged to be the opinion, the correction input confirming means asks whether to correct to the fact or the emotion. The correction input confirming means is, for example, displaying a correction dialogue or the like.

Each participant presents a problem and suggests a solution for that while the conference proceeds. When the proposal of the solution is submitted, if the proposal is known to be the participant's own opinion, the fact of being an opinion is pointed out and whether to correct to a fact or an emotion is displayed. If the solution is a fact or an emotion, it contributes to smooth conference proceeding.

(Claim 5)

The invention according to claim 5 limits the management server for teleconference according to any one of claim 1 to claim 4.

In other words, the management server for teleconference system has a solution data receiving means for receiving solution data proposed as a solution for the problem from the terminal device; and an additional solution input instructing means for instructing the terminal device to propose an additional solution different from the solution data.

(Functions)

The problem suggested by the participant is converted into the questioning format. The problem solution data is received from this questioning format. On the other hand, the additional solution input instructing means transmits instruction data for prompting the participant to input an additional solution different from the solution data having been already received. For this, it is considered a case that a dialogue such as "Please enter two more trifling ideas" is displayed to instruct the participant to input.

An input of the additional solution is instructed, not from a viewpoint of whether or not the additional solution is executed, but for the reason that it is important to increase possibility of solutions from the problem by more participants extracting ideas.

(Claim 6)

The invention according to claim 6 limits the management server for teleconference system according to any one of claim 1 to claim 5.

In other words, the management server for teleconference system has a use language selecting means for enabling selection of a use language of the teleconference, wherein the usable language includes at least English.

In the present claim, the usable language is set to be English, but it is possible to support, in addition thereto, a plurality of languages such as Chinese, Korean, French, Spanish, German, and Italy.

(Functions)

In the present invention, as the use language to be used in the teleconference, English is usable in addition to Japanese.

If a language other than Japanese is usable in a teleconference, a Japanese person can get training of English through the teleconference. Besides, for a foreigner, since English is supported, difficulty in understanding of Japanese or inputting by Japanese does not hamper participation in the teleconference.

(Claim 7)

The invention according to claim 7 limits the management server for teleconference system according to claim 6.

In other words, the management server for teleconference system has a multilingual conversion judging means for asking whether or not the problem inputted by the input means of the terminal device is convertible into multiple languages.

(Functions)

The multilingual conversion judging means judges whether or not the problem inputted by the terminal device can be converted into multiple languages. Here, if conversion to the multiple languages is possible, the problem is converted into the multiple languages and submitted. Conversion of the problem into the multiple languages contributes to training of multiple languages. It should be noted that the multiple languages means mainly English but can be other languages described in the explanation of claim 6.

(Claim 8)

The invention according to claim 8 limits the management server for teleconference system according to claim 6 or claim 7.

In other words, the management server for teleconference system has a spelling check judging means for judging spelling check at a time of multilingual input; and a spelling displaying means for displaying in the terminal device a correct spelling for the spelling judged to be an incorrect spelling by the spelling check judging means.

The multiple languages means mainly English but can be other languages described in explanation of claim 6.

(Functions)

When the problem or the like is inputted in multiple languages, the spelling check judging means judges a spelling mistake in multiple languages. If it is judged that the spelling is incorrect, a correct spelling is displayed in the terminal device to prompt correction. Thereby, the correct spelling is learned through the teleconference and the above contributes to improvement of a language skill.

(Claim 9)

The invention according to claim 9 relates to a computer program network-connected by a plurality of terminal devices participating in a teleconference and enabling information related to the teleconference to be displayed in each terminal device.

The computer program is configured to cause a computer to realize a statement information receiving step for receiving statement information such as a problem concerning an agenda and a solution for the problem which are inputted from an input means of the terminal device; a statement information transmitting step for transmitting the statement information received by the statement information receiving step to all the terminal devices participating in the teleconference; a statement information accumulating step for once accumulating without displaying in the terminal device of a participant temporarily; a statement information transmitting step for transmitting the statement information to all the terminal devices participating in the teleconference, when in accordance with a judgment of a chairman leading the teleconference an input means of the chairman's side terminal device of the chairman transmits a disclosure permission signal of the accumulated statement information; a statement attribute data receiving step for receiving statement attribute data from the statement information created by a certain participant's operation in each terminal device having received the statement information; a storing step for storing the statement attribute data received by the statement attribute data receiving step and the statement information in an information database; and a commitment generating step for generating a commitment related to the teleconference, based on the statement attribute data and the statement information stored in the information database.

(Claim 10)

The invention according to claim 10 limits the computer program according to claim 9.

In other words, the commitment generating step has a commitment creation request transmitting step for selecting a solution adopted as a commitment among solutions for the problem inputted by the input means of the terminal device and for requesting creation of the commitment of the terminal device having proposed the selected solution for the problem.

(Claim 11)

The invention according to claim 11 limits the computer program according to claim 9.

In other words, the computer program has a questioning format transmitting step for receiving the problem inputted by the input means of the terminal device, and for converting the inputted problem into a predetermined questioning format to enable the terminal device to create a questioning document by using that questioning format.

(Claim 12)

The invention according to claim 12 limits the computer program according to claim 11.

In other words, the computer program has a problem solution data receiving step for receiving problem solution data for solving the problem converted into the questioning format from the terminal device; a status confirmation judging step for judging which of a fact, an emotion and an opinion the received problem solution data is; and a correction input confirming step for asking whether to correct to the fact or the emotion when the problem solution data is judged to be the opinion by the status confirmation judging step.

(Claim 13)

The invention according to claim 13 limits the computer program according to any one of claim 9 to claim 12.

In other words, the computer program has a solution data receiving step for receiving solution data proposed as a solution for the problem from the terminal device; and an additional solution input instructing step for instructing the terminal device to propose an additional solution different from the solution data.

(Claim 14)

The invention according to claim 14 limits the computer program according to any one of claim 9 to claim 13.

In other words, the computer program has a use language selecting step for enabling selection of a use language of the teleconference, wherein the usable language includes at least English.

(Claim 15)

The invention according to claim 15 limits the computer program according to claim 14.

In other words, the computer program has a multilingual conversion judging step for asking whether or not the problem inputted by the input means of the terminal device is convertible to multiple languages.

(Claim 16)

The invention according to claim 16 limits the computer program according to claim 14 or claim 15.

In other words, the computer program has a spelling check judging step for judging spelling check at a time of multilingual input; and a spelling displaying step for displaying in the terminal device a correct spelling for the spelling judged to be an incorrect spelling by the spelling check judging step.

It is also possible to provide the computer program according to claim 9 to claim 16 stored in a storage medium. Here, "storage medium" means a medium capable of holding a program that cannot occupy a space itself, and is, for example, a flexible disk, a hard disk, a CD-R, an MO (magnetic optical disk), a DVD-R, or a flash memory. Further, it is also possible to transmit the program according to the present invention from a computer storing the program to another terminal device via a communication line.

EFFECT Of The INVENTION

According to the invention of claim 1 to claim 5, there is provided a management server for teleconference system enabling easy participation in a conference even from a geographically long distance and drastically decreasing trouble of creating a result of the conference.

According to the invention of claim 6 to claim 8, there is provided a management server for teleconference system enabling training of English or multiple languages through a teleconference, to lead to an improved skill of languages.

According to the invention of claim 9 to claim 13, there is provided a computer program enabling easy participation in a conference even from a geographically long distance and drastically decreasing trouble of creating a result of the conference.

According to the invention of claim 14 to claim 16, there is provided a computer program enabling training of English or multiple languages through a teleconference, to lead to an improved skill of languages.

BRIEF DESCRIPTION OF DRAWINGS

FIG. 13 is a screen of a chairman's side terminal device, and is a schematic diagram showing a status of conference preparation of a teleconference;

FIG. 14 is a screen of a chairman's side terminal device, and is a schematic diagram showing a status of a problem extracting screen of a teleconference;

FIG. 23 is a screen of a participant's side terminal device, and is a schematic diagram showing a vote completion screen;

FIG. 24 is a screen of a chairman's side terminal device, and is a schematic diagram showing a dialogue to determine order to solve problems;

FIG. 31 is a screen of a chairman's side terminal device, and is a schematic diagram showing a status confirmation end screen;

FIG. 32 is a screen of a participant's side terminal device, and is a schematic diagram showing a screen which lists confirmation of statuses by the participants;

FIG. 37 is a screen of the chairman's side terminal device, and is a schematic diagram showing a dialogue for adoption start confirmation of solutions;

FIG. 38 is a screen of a chairman's side terminal device, and is a schematic diagram showing a screen for proceeding to a commitment creation processing;

FIG. 41 is a screen of a participant's side terminal device, and is a schematic diagram showing a screen in a case that a commitment creation request is accepted;

FIG. 42 is a screen of a participant's side terminal device, and is a schematic diagram showing a commitment creation confirmation screen.

Figure 1:
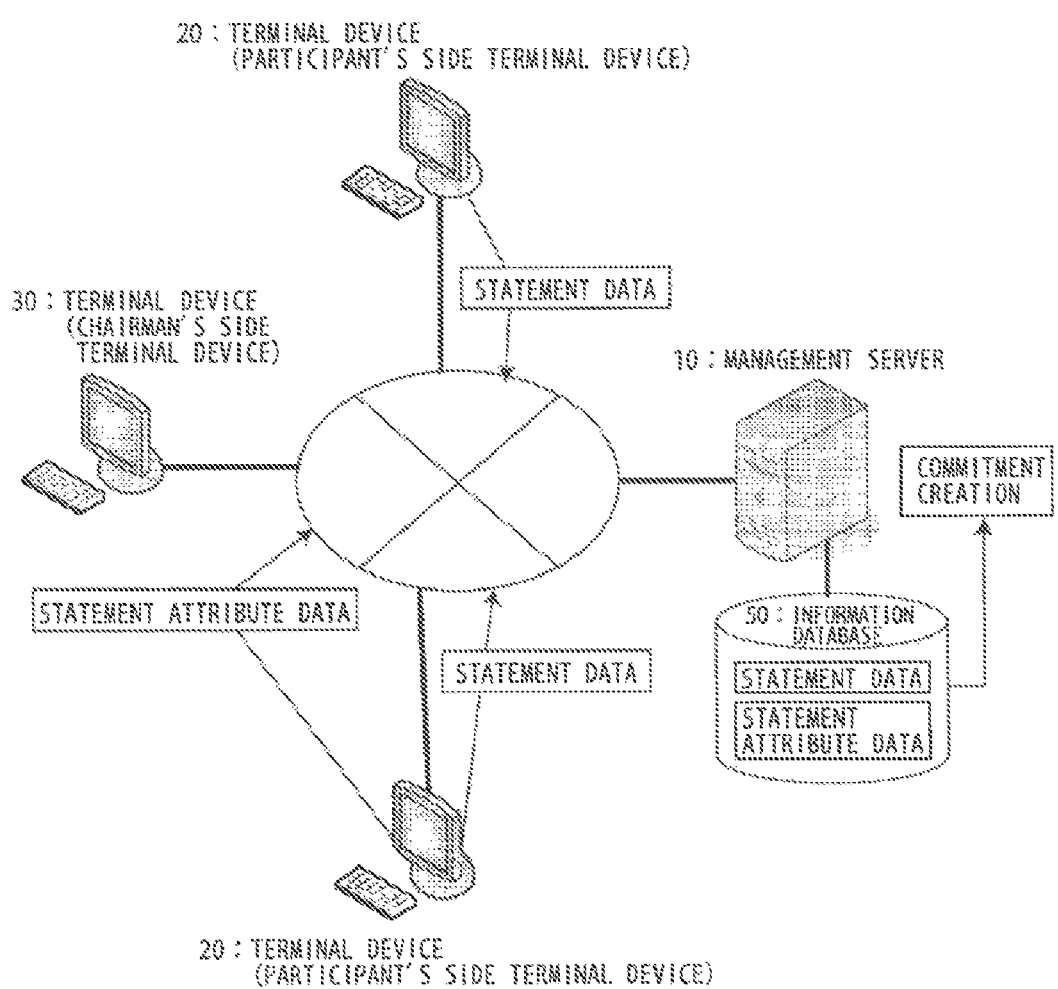
FIG. 1 is a schematic diagram showing an entire configuration of a teleconference system.

BRIEF DESCRIPTION OF REFERENCE NUMERALS 10 management server
11, 21, 31 CPU
12, 22, 32 RAM
13, 23, 33 storage unit
14, 24, 34 input unit
15, 25, 35 display unit
16, 26, 36 communication unit
17, 27, 37 output unit
18, 28, 38 input/output port
20 participant's side terminal device
30 chairman's side terminal device
50 information database

BEST MODE FOR CARRYING OUT THE INVENTION

Hereinafter, an embodiment of the present invention will be described with reference to the drawings. The drawings used here are from FIG. 1 to FIG. 43.

Figure 2:
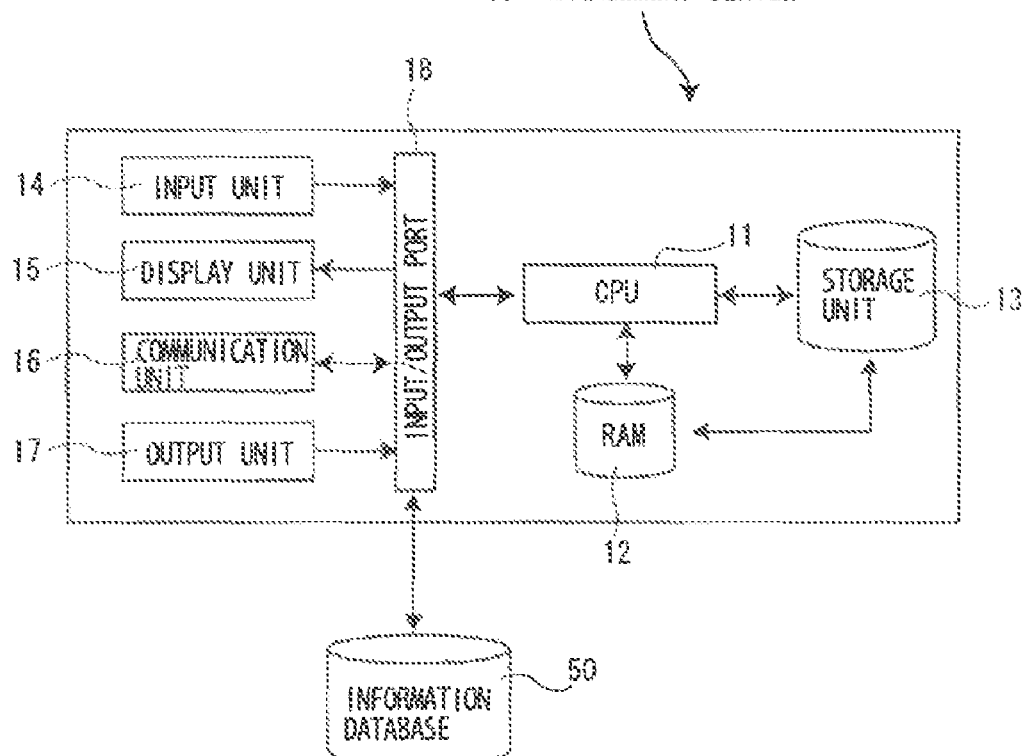
FIG. 2 is a block showing a hardware configuration of a management server.
Figure 3:
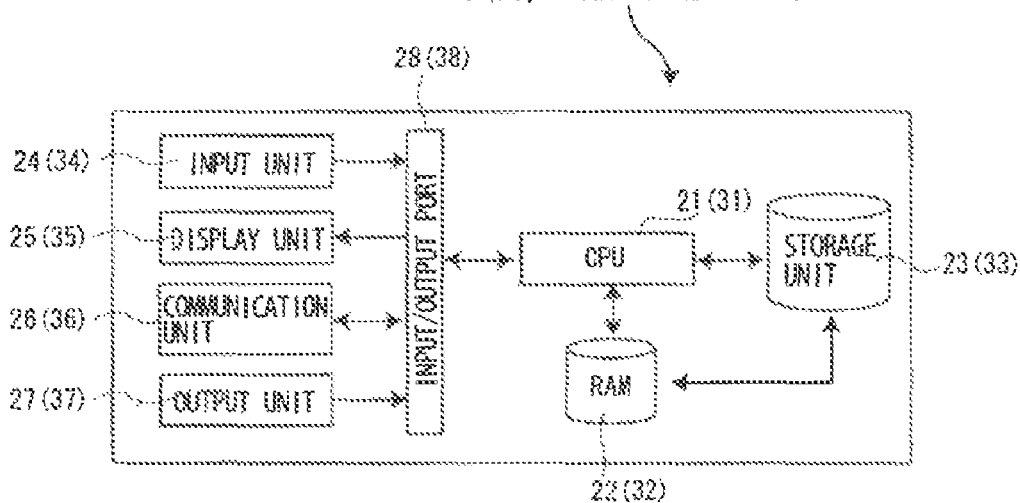
FIG. 3 is a block showing a hardware configuration of a terminal device.
Figure 4A:
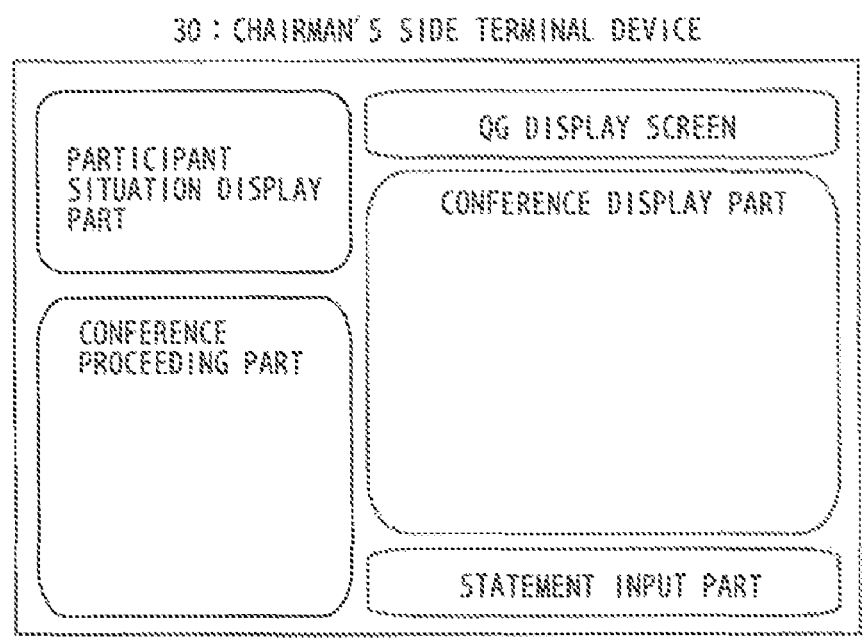
FIG. 4 is a schematic diagram showing a GUI of a terminal device.
Figure 4B:
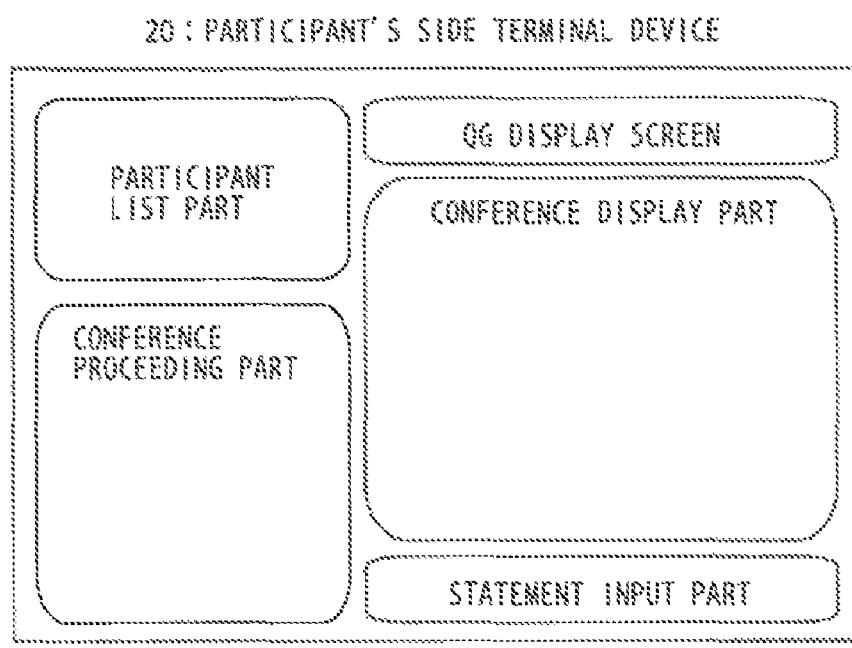
Figure 5:
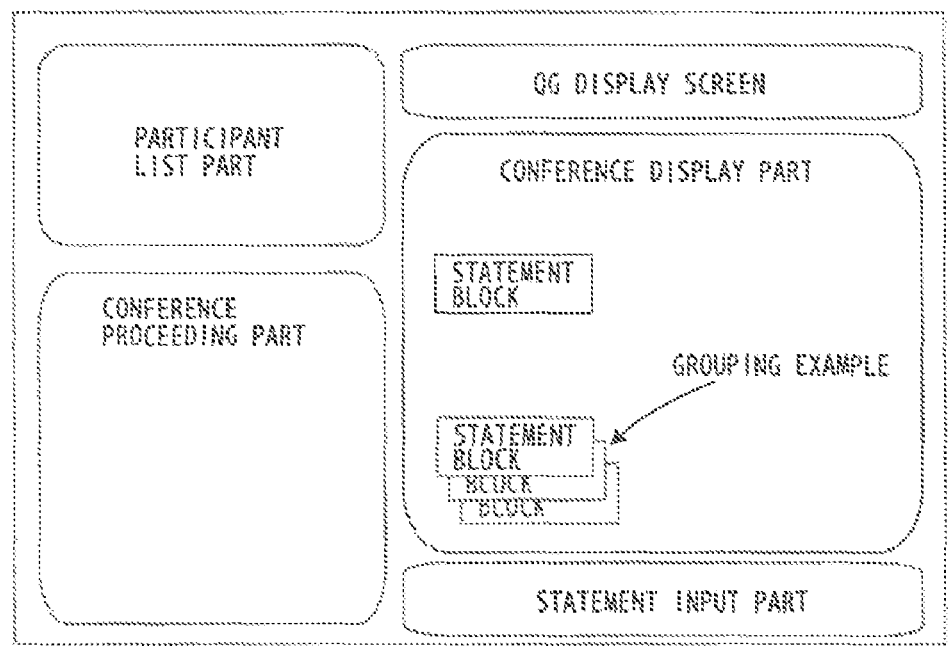
FIG. 5 is a schematic diagram showing an example of grouping of statement blocks.
Figure 6:
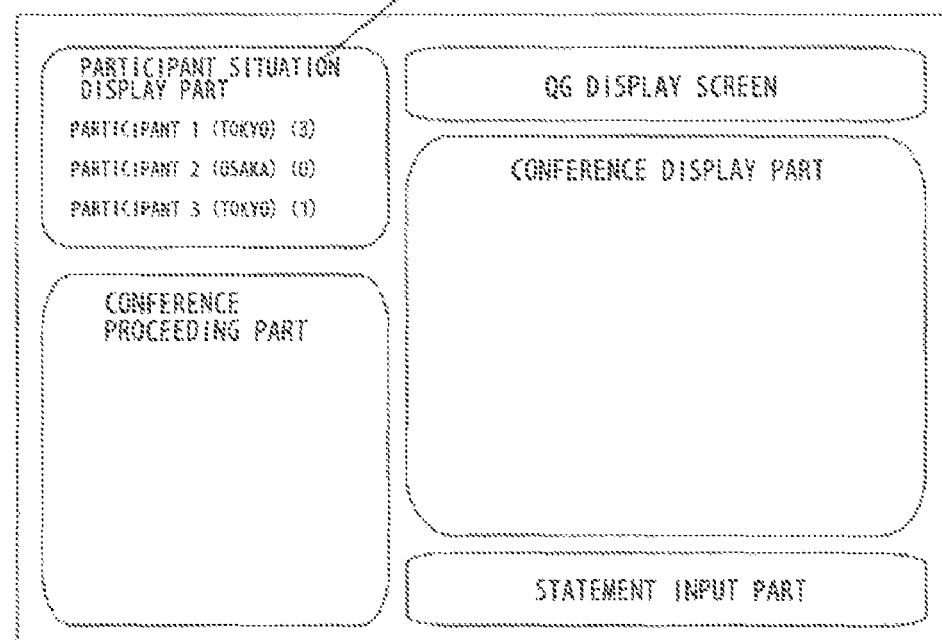
FIG. 6 is a schematic diagram showing a statement input number in a participant situation display part.

FIG. 1 is a schematic diagram showing an entire configuration of a teleconference system, FIG. 2 is a block diagram showing a hardware configuration of a management server, FIG. 3 is a block diagram showing a hardware configuration of a terminal device, FIG. 4 is a schematic diagram showing a GUI of the terminal device, FIG. 5 is a schematic diagram showing an example of grouping of statement blocks, FIG. 6 is a schematic diagram showing a statement input number in a participant situation display part, and FIG. 7 to FIG. 10 are flowcharts showing respective processings in the teleconference system. Further, FIG. 11 to FIG. 43 are schematic diagrams showing proceeding states of teleconference carried out between participant's side terminal devices and a chairman's side terminal device.

(Entire Configuration)

In the teleconference system shown in FIG. 1, a plurality of participant's side terminal devices (terminal device) 20 which participate in a teleconference, a chairman's side terminal device (terminal device) 30 elected as a person to lead the conference among the participant's side terminal devices 20, and a management server 10 which has a function of performing data transmission/reception to/from those terminal devices 20, 30 or data management thereof are connected to one another via Internet.

Further, statement content by each participant is displayed in a display (displaying means) of each display device 20, 30 as common information, and the statement content is recorded in an information database 50 as necessary. Then, by the each participant exchanging opinions, minutes (commitment) being a result of the conference is generated.

(Management Server)

FIG. 2 is a block showing a hardware configuration of the management server 10.

The management server 10 functions as an application server and is constituted with a CPU 11 which controls the whole of the management server 10 and performs various calculation processings, a RAM 12 which temporarily develops data when writing the various data, a storage unit 13 in which an operating system, application software and the various data are stored, an input unit 14 such as a mouse or a keyboard, a display unit 15 such as a display, a communication unit 16 connectable to an electric communication line such as Internet or intranet, an output unit 17 capable of outputting the various data to a printer or the like, and an input/output port 18 being an input/output unit of the various data. In the storage unit 13, a file, an image, a movie, audio, or sentences linked to screens displayed in the participant's side terminal device 20 and the chairman's side terminal device 30 is stored. Further, as a second storage device of the management server 10, an information database 50 is provided, and data can be mutually transmitted/received to/by the management server 10.

In the information database 50, there are stored participant's information such as participant's name, and in addition, statement information inputted from the terminal device of the participant, statement attribute data or the like.

It should be noted that the information database 50 is housed in the management server 10 but can be deposited in a place physically apart therefrom as an external storage device.

(Function of Management Server)

The management server 10 has: a statement information receiving means for receiving statement information such as problems and solutions therefore inputted by the input means of the terminal devices 20, 30 (chairman's side terminal is the terminal device 30); a statement information accumulating means for once accumulating the statement information received by the statement information receiving means without displaying the statement information in the terminal device of the participant temporarily; a statement transmitting means for transmitting to all the terminal devices 20, 30 which participate in the teleconference, when according to a judgment of a chairman leading the teleconference an input unit 34 of the chairman's side terminal device 30 of the chairman transmits a disclosure permission signal of the accumulated statement information; a statement attribute data receiving means for receiving statement attribute data created by, with the statement information displayed on a display means of the respective terminal devices 20, 30 having received that statement information being one block, merging and grouping or choosing the respective blocks on the display means by the participant's intention, to sort the statement information freely; and a commitment generating means for generating a commitment related to the teleconference based on the statement attribute data and the statement information stored in the information database 50.

Here, "statement information" means statement content such as problems, solutions for the problems and the like presented by the participant and the chairman participating in the teleconference. The statement information is displayed on the display with one statement being one block and stored in the information database 50 together with the name of the participant or date and time information.

"Statement information accumulating means" is a function provided so that the teleconference proceeds without the participant in the teleconference accessing another participant's opinion or statement. According to this function, since another participant's opinion is not accessible, each participant is not influenced by another participant's opinion and is almost forced to be given time to consider an agenda of the conference by himself Thus, eagerness in participating in the teleconference or seriousness is improved, so that more active exchange of opinions can be expected to be enhanced. It should be noted that the accumulation here of the statement information is temporary and the statement information can be disclosed to the participants depending on the judgment of the chairman who leads the conference.

"Statement attribute data" is data sorted by the participant by performing merging, grouping, and choosing based on the statement information. Merging, being one of the statement attributes, means combining and blending the statement content displayed on the display. Further, grouping means connecting the statement content displayed on the display to be one, while choosing means leaving or discarding the statement contents displayed on the display.

"Input means" is a keyboard, a mouse, or a microphone used for an audio input which are provided in the terminal device. Merging, grouping, or choosing is carried out by using the mouse.

(Questioning Format Transmitting Function)

The management server 10 has a questioning format transmitting function.

The questioning format transmitting function is a function of receiving the problem inputted by the input means of the participant's side terminal device 20 and converting the inputted problem into a predetermined questioning format to enable the participant's side terminal device 20 to create a questioning document by using that questioning format.

For instance, presume that an example of the problems the participants have is "It takes time to do paperwork after returning to the office. What shall I do?"

In this case, there is a background that a long time operation for doing paperwork is seen as a problem, and the sentence can be converted as follows:

"How can I decrease time for paperwork after returning to the office?"

Otherwise, if an efficiency in paperwork is seen as a problem, the sentence can be converted as "How can I improve efficiency in paperwork after returning to the office?"

In other words, when the participant in the teleconference inputs the problem, usually it is often inputted in a form, such as "It takes time to do paperwork after returning to the office and it is hard." By transmitting the questioning format, it becomes easy to convert the above sentence into " How can I improve efficiency in paperwork time after returning to the office?" or the like. In other words, if a form enabling conversion into the questioning format is transmitted in advance, it becomes easy for the participant to enter a solution for problem presentation.

(Commitment Creating Function)

The management server 10 has a commitment creating function. In this commitment creating function, a commitment is created based on the statement attribute data and the statement information stored in the information database 50. More specifically, a commitment generating means selects a solution adopted as a commitment among solutions for the problem inputted by the input means of the participant's side terminal device 20 participating in the teleconference, and requests the participant's side terminal device 20 having suggested that selected solution for the problem to create a commitment.

In other words, for a problem presented in the teleconference, each participant suggests a solution. The chairman and the participant determines a good solution among those plurality of solutions.

As for the determined solution, a commitment creation request transmitting means transmits a creation request to the terminal device of the participant having suggested the solution so that the participant creates the commitment.

The relevant terminal device is allowed to select whether or not to accept the creation request.

In other words, since generation of the commitment becomes possible during the meeting of the teleconference, it becomes unnecessary to take trouble of creating a commitment after the meeting as in an ordinary conference.

(Terminal Device)

FIG. 3 is a block diagram showing a hardware configuration of the terminal device.

The participant's side terminal device 20 and the chairman's side terminal device 30 are each constituted with a CPU 21 (31) which controls the whole of the terminal device 20 (30) and performs various calculation processings, a RAM 22 (32) which temporarily develops data when writing the various data, a storage unit 23 (33) in which an operating system, application software and the various data are stored, an input unit 24 (34) such as a mouse or a keyboard, a display unit 25 (35) such as a display, a communication unit 26 (36) connectable to an electric communication line such as Internet or intranet, an output unit 27 (37) capable of outputting the various data to a printer or the like, and an input/output port 28 (38) being an input/output unit of the various data.

(Screen Configuration)

FIG. 4 to FIG. 6 are diagrams showing a GUI (graphical user interface) of the participant's side terminal device 20 and the chairman's side terminal device 30.

In a left side area of the screen of the chairman's side terminal device 30 shown in FIG. 4A, a participant situation display part and a conference proceeding part are disposed in order from above, while in a right side area of the screen, a QG (quality goal) display part, a conference display part and a statement input part are disposed in order from above, whereby the GUI is constituted. In the GUI of the chairman's side terminal device 30, display items are switched depending on a proceeding state of the teleconference.

Further, in a left side area of the screen of the participant's side terminal device 20 shown in FIG. 4B, a participant list part and a conference proceeding part are disposed in order from above, while in a right side area of the screen, a QG display part and a conference display part are disposed in order from above, whereby the GUI is constituted. In the GUI of the participant's side terminal device 20, the screen is switched depending on a proceeding state of the chairman.

The statement input parts in the participant's side terminal device 20 and the chairman's side terminal device 30 are each a part to which a statement in the teleconference is inputted by the input means such as the keyboard, the mouse and the audio microphone. In this part, since inputting of a plurality of statements at a time is taken into consideration, it is possible to present plural statements.

In the conference display part, a stylized form corresponding to the proceeding state of the teleconference is displayed, and inside thereof are displayed the statements presented by the chairman and the participant with one statement being one block. As a result that all the participants in the teleconference perform merging, grouping, choosing of these statement blocks by operating mouse, the statement information can be freely sorted to create the statement attribute data. FIG. 5 is an example of grouping of the statement blocks.

Those which are mounted in the GUI exclusively for the chairman's side terminal device 30 are the participant situation display part, the QG display part, and the statement input unit. The participant situation display part shown in FIG. 6 displays the participant list and how many statements the participant has inputted in the present proceeding state by using a number.

The QG display part can proceed from time to time depending on the status of the participant. By the proceeding, the conference display parts of all the participating terminal devices are altered. As for the QG display part, going forward and backward are possible.

The statement input part displays a timer function, a chairman's power alienating function, a present status saving function, a previous status reading function, an output function and the like which are necessary in the teleconference proceeding, and the above support the proceeding of the teleconference.

Those which are mounted exclusively for the participant's terminal device 20 are the teleconference status part and the participants list part. The QG display part displays the present status of the teleconference and displays an agenda or the like, depending on the status.

The participant's list part displays a list of the participants who are presently participating in the teleconference, and as for the display content, names, connection places or the like are displayed. Further, the chairman is given a marker (eye-mark or color of character) for recognizing the chairman, so that distinction is easy.

(Teleconference Preparation—Problem Extracting Processing)

Next, a series of processings of a teleconference system will be described with reference to FIG. 7 to FIG. 10.

Figure 7:
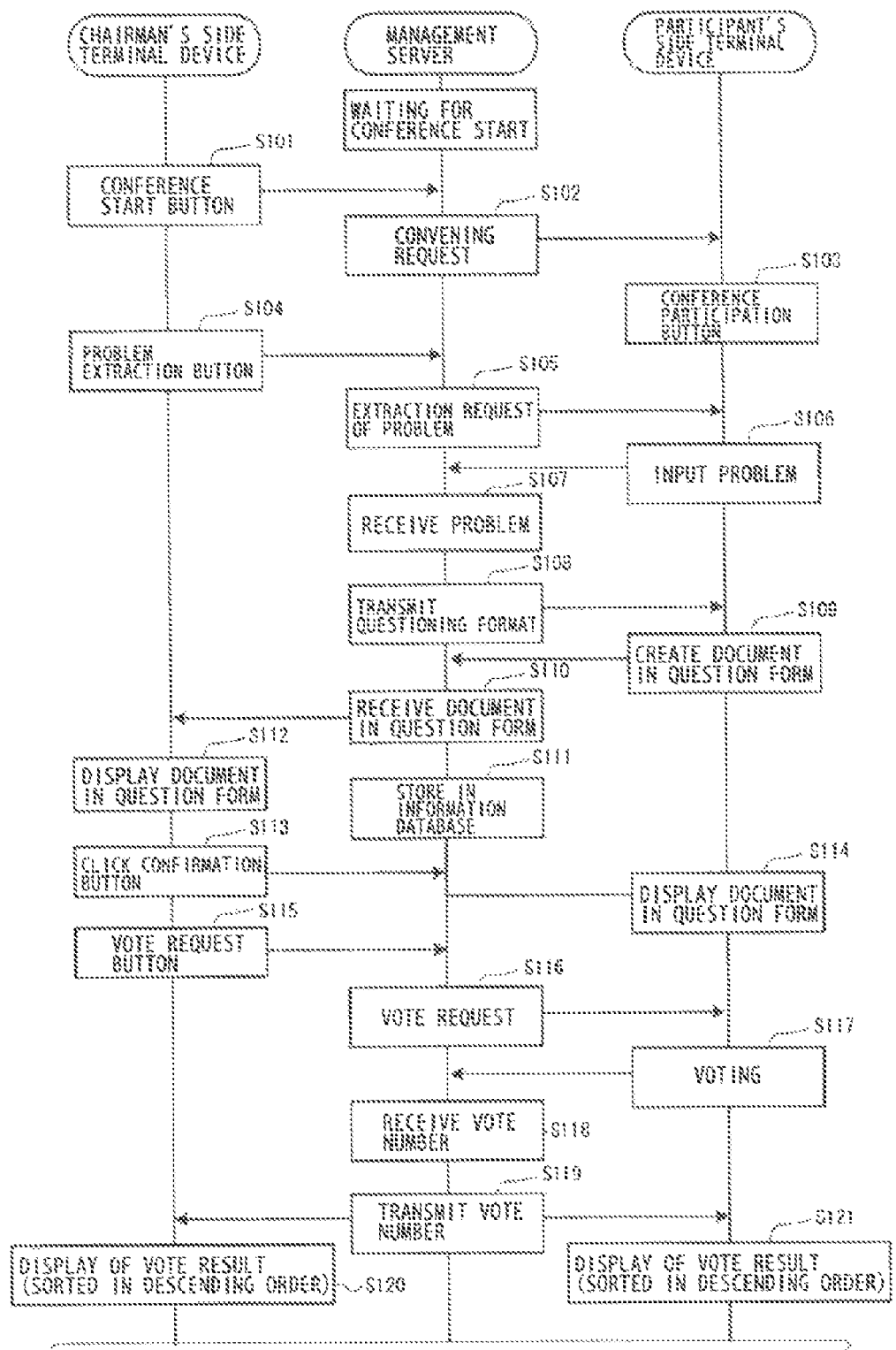
FIG. 7 is a flowchart showing processings of a teleconference system.

FIG. 7 is a flowchart showing processings from preparation of a teleconference to extraction of problems, while FIG. 11 to FIG. 23 are diagrams showing display statuses of the displays in the participant's side terminal device 20 and the chairman's side terminal device 30. The teleconference proceeds in order of "conference preparation, extraction of problem, problem definition, confirmation of status, presentation of solution, commitment creation". It should be noted that the proceeding of the conference is done automatically by a timer function.

Figure 11:
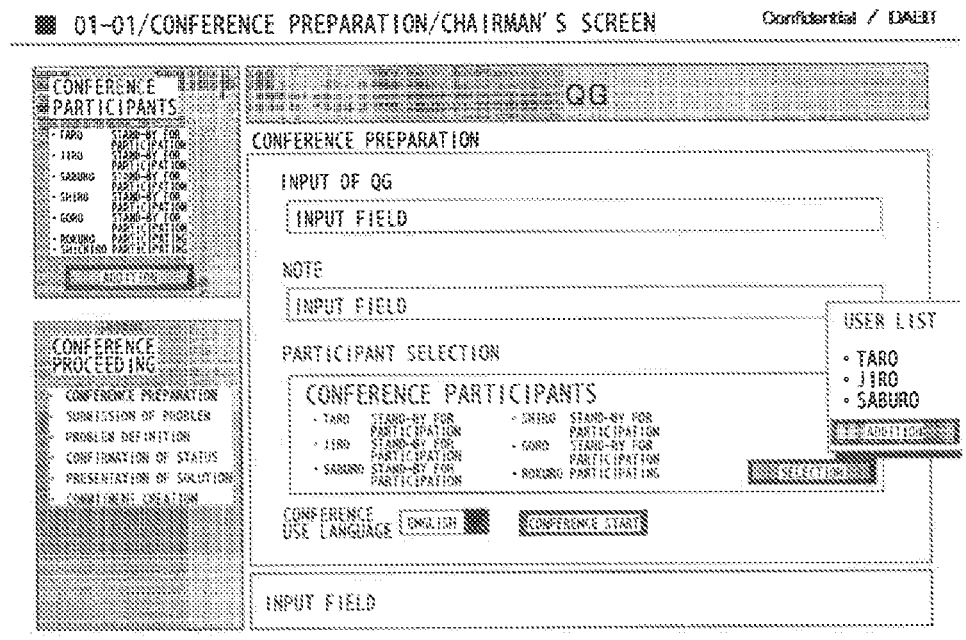
FIG. 11 is a screen of a chairman's side terminal device, and is a schematic diagram showing a status of conference preparation of a teleconference.

First, the chairman's side terminal device 30, as shown in FIG. 11, inputs a QG (quality goal) and a recital, selects participants, and presses a convening button when preparation is completed, by the chairman's operation (S101). Further, as shown in FIG. 11, Japanese or English can be selected as a use language which is used in the conference. When English is selected, the conference proceeds in English.

When receiving a signal of the convening button, the management server 10 transmits a teleconference convening request to the participant's side terminal device 20 (S102).

Figure 12:
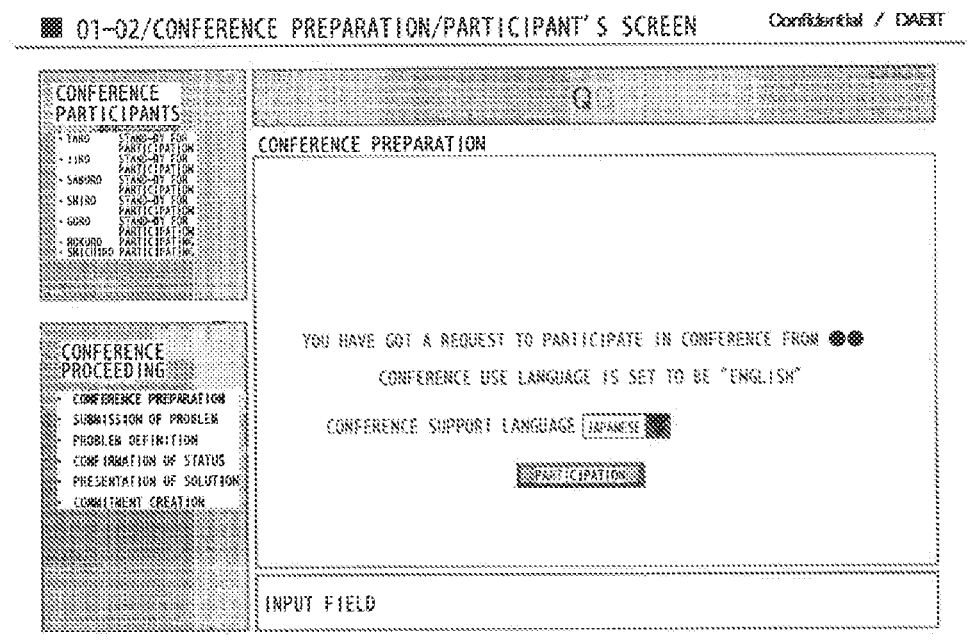
FIG. 12 is a screen of a participant's terminal device, and is a schematic diagram showing a status of a use language selecting screen in a teleconference.

On the display of the participant's side terminal device 20, "You have got a request to participate in a conference from XX" is displayed, and by the participant's pressing a participation button for participating in the conference, it becomes possible to participate in the conference (S103). Meanwhile, here, as shown in FIG. 12, it is possible to select Japanese as a conference support language. If Japanese is selected, even when the conference proceeds in English, support in Japanese is available.

Figures 13, 14:
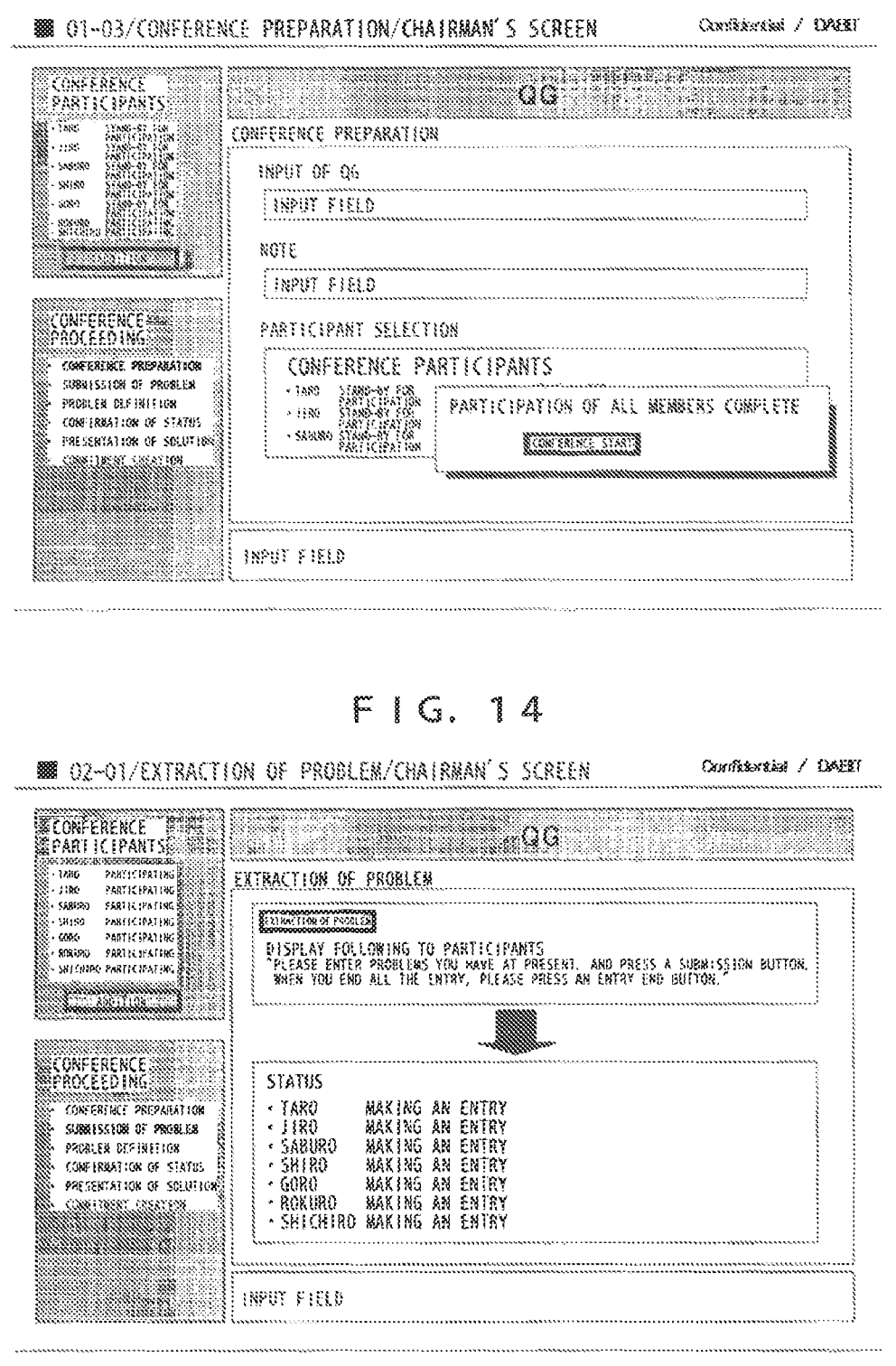

After acquiring confirmation of all the participants, as shown in FIG. 13, in the chairman's side terminal device 30 a conference start button is pressed by the chairman's operation and the conference is started.

Subsequently, extraction of problems is performed. The chairman's side terminal device 30 presses a problem extraction button by the chairman's operation to have the participants input problems (S104).

When receiving a signal of the problem extraction button, the management server 10 transmits a problem extraction request to the participant's side terminal device 20 (S105).

Figure 15:
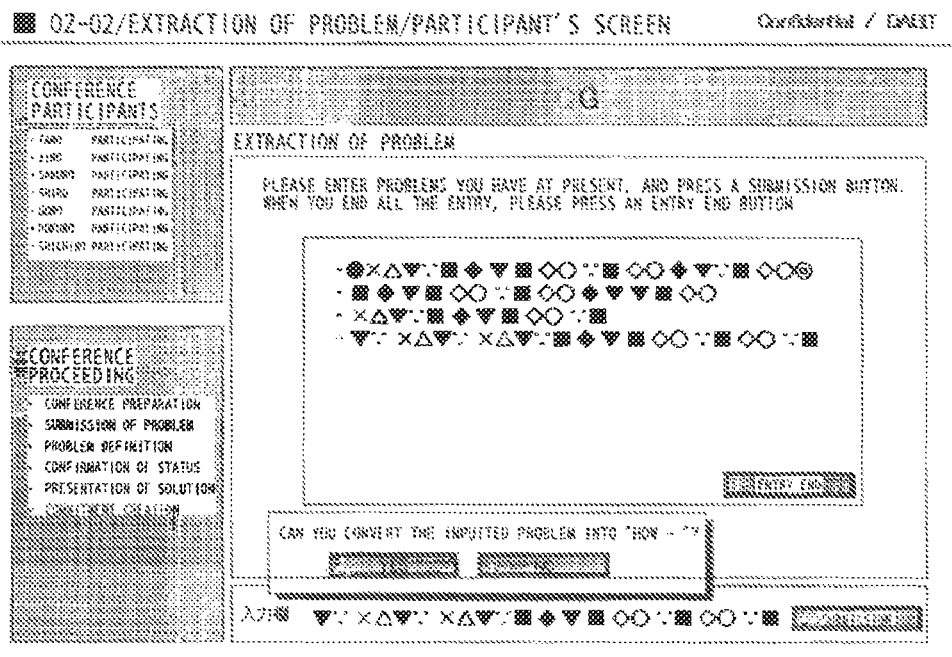
FIG. 15 is a screen of a participant's side terminal device, and is a schematic diagram showing a status of a problem extracting screen of a teleconference.

On the display of the participant's side terminal device, as shown in FIG. 15, "Please enter problems you have at present, and press a submission button. When you end all the entry, please press an entry end button." is displayed, and the participant inputs the problems in accordance with such an instruction (S106).

Figure 16:
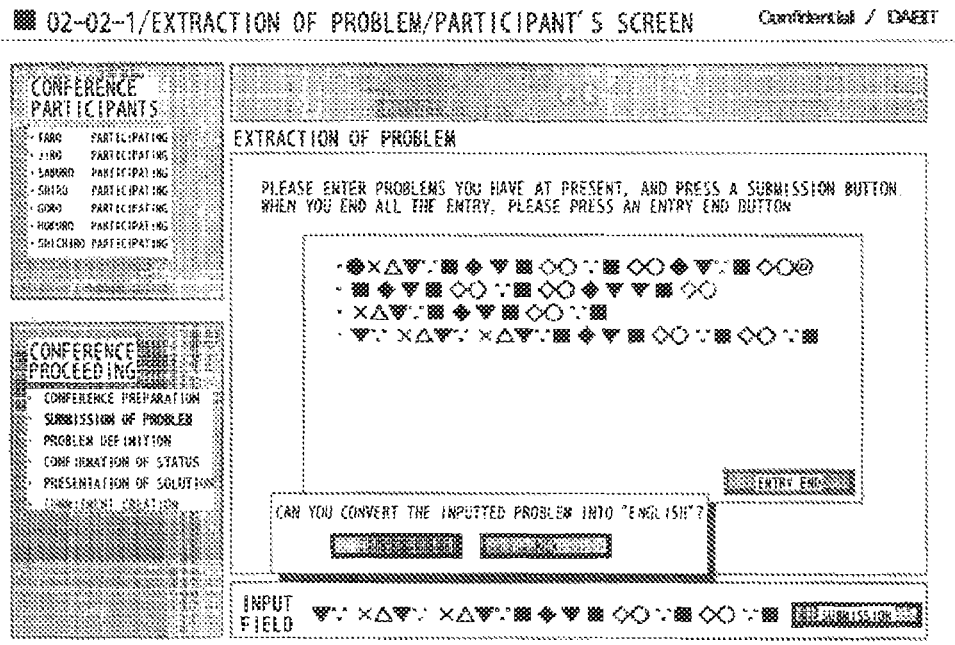
FIG. 16 is a screen of a participant's side terminal device, and is a schematic diagram showing a screen asking whether or not conversion into English is possible in a problem extracting screen of a teleconference.

It should be noted that after the input of the problems, as shown in FIG. 16, there is displayed a dialogue asking whether or not the inputted problems can be converted into English. If conversion into English is necessary, the participant selects "Yes" and if conversion is not necessary, the participant selects "No".

The management server 10 receives the problem inputted by the participant's operation (S107: statement information receiving means). Here, a conversion document creating means of the management server presents a dialogue asking whether or not the inputted problem can be converted into a questioning format of "How-?" to the participant's side terminal device 20 (S108).

If conversion into the questioning format is possible from the participant's side terminal device 20 by the participant's operation, a document in a questioning form is created and the entry end button is clicked (S109).

For example, presume that the problem the participant has is "I presently go out on sales calls, and it takes much time to do paperwork after returning to the office". Ordinarily, such a sentence is often inputted in a form such as "It is hard as it takes time to do paperwork after returning to the office." If the questioning format of "How-?" is transmitted and the above sentence is converted in accordance with that format, a sentence "How can I improve efficiency in paperwork time after returning to the office?" is brought.

If the problem is not in long time operation but in efficiency, the sentence can be converted into "How can I decrease time for paperwork after returning to the office?". In other words, by transmitting the form enabling conversion into the questioning format in advance, it becomes easier for the participant to write to present the problem.

The management server 10 receives a document in that question form and transmits it to the chairman's side terminal device 30 (S110), and stores the document in the question form in the information database 50 (S111).

Figure 17:
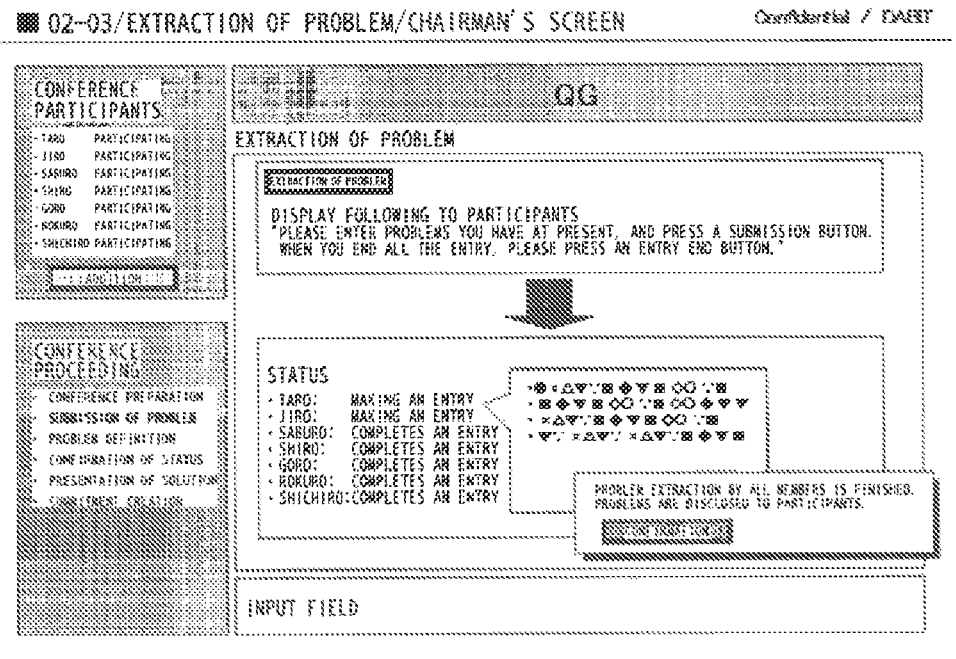
FIG. 17 is a screen of a chairman's side terminal device and is a schematic diagram showing a state of a problem extracting screen of a teleconference.
Figure 18:
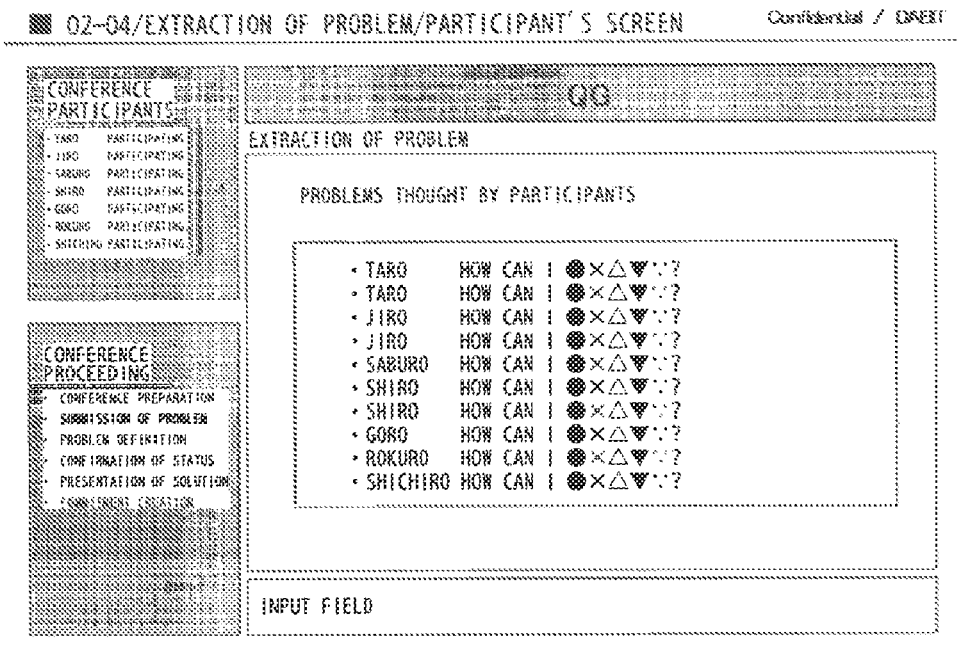
FIG. 18 is a screen of a participant's side terminal device, and is a schematic diagram showing a screen in which a problem of reach participant is displayed.

On a display of the chairman's side terminal device 30, the transmitted document in the question form is displayed, and as shown in FIG. 17, a dialogue telling that the document is disclosed to the participants is displayed (S112). The above is done by using a statement information accumulating function, and the documents of the participants come in a state of not being disclosed temporarily until the chairman clicks a confirmation button. Here, when the confirmation button is clicked by the chairman's operation to instruct (disclosure permission signal) disclosure of the documents in the question form (113), the problems having been accumulated in the chairman's side is disclosed to the display of the participant's side terminal device 20 (114).

Figure 19:
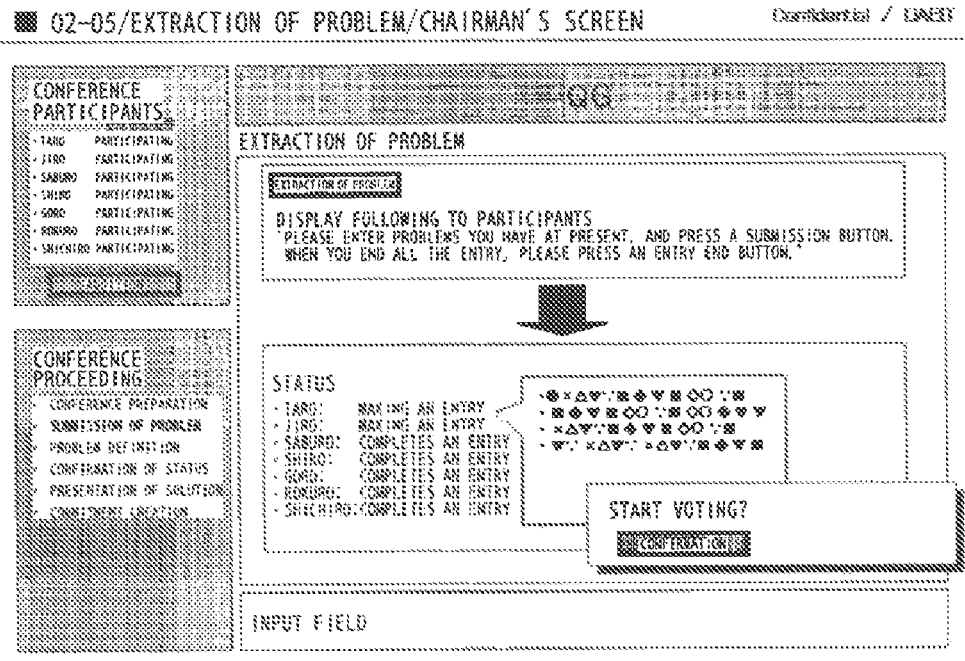
FIG. 19 is a screen of a chairman's side terminal device, and is a schematic diagram showing a processing to start a vote on extracted problems.

Subsequently, as shown in FIG. 19, in order to determine which problem to solve first among the problems the participants have, a dialogue asking "Do you start voting?" is displayed on a display of the chairman's side terminal device 30. When a confirmation button for a vote request is clicked (S115) in the chairman's side terminal device 30, the management server 10 receives a signal of that confirmation button, whereby a vote request dialogue is transmitted to the participant' side terminal device 20 (S116).

An input dialogue of the vote request is displayed on a display of the participant's side terminal device 20, and voting can be carried out (S117).

Figure 20:
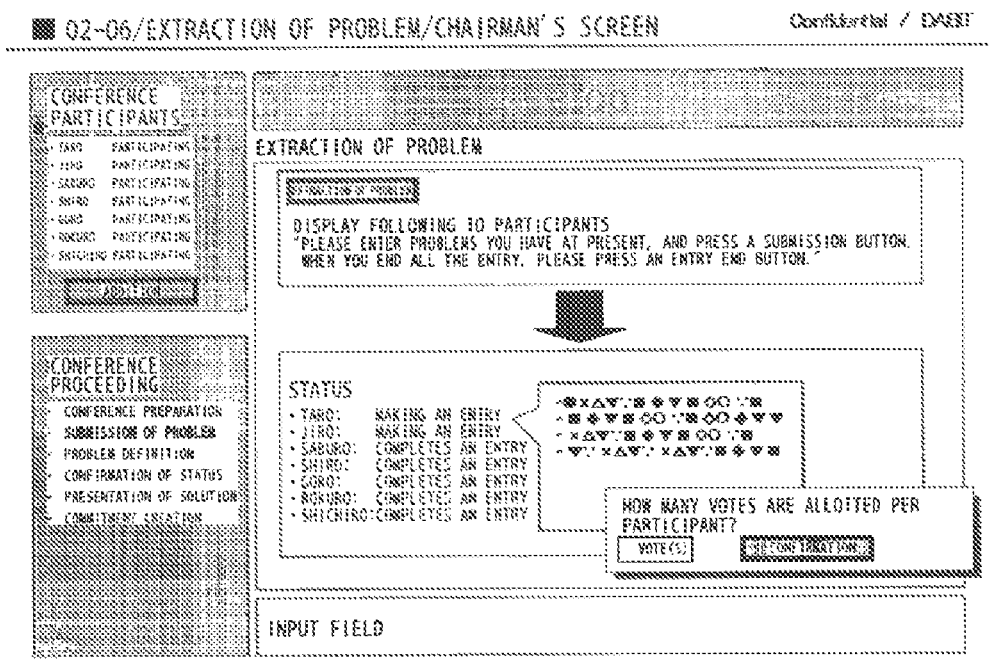
FIG. 20 is a screen of a chairman's side terminal device, and is a schematic diagram showing a selection status of a vote count.
Figure 21:
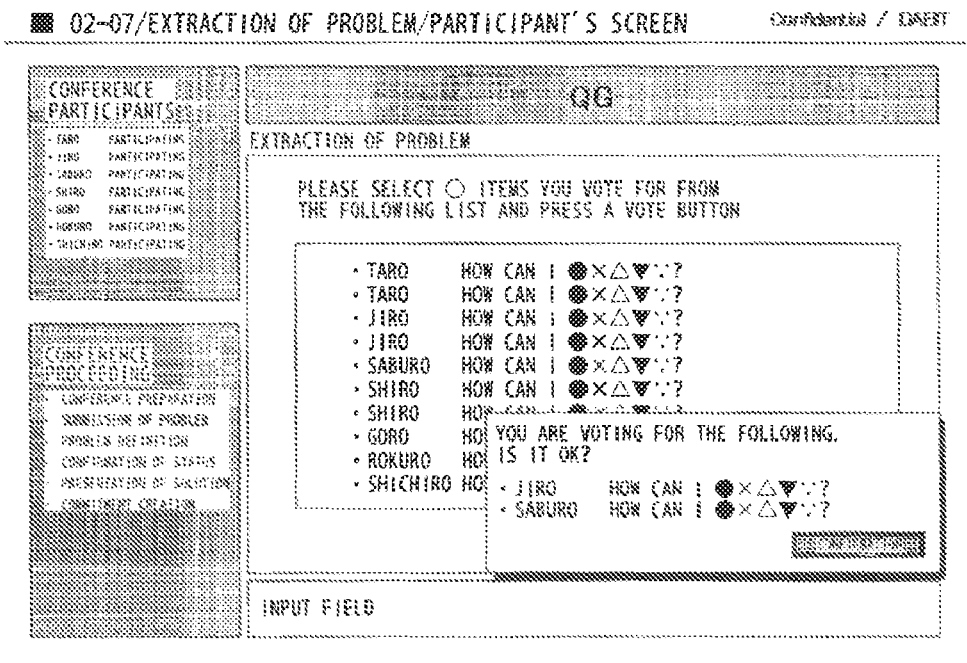
FIG. 21 is a screen of a participant's side terminal device, and is a schematic diagram showing a vote screen.

It should be noted that in the chairman's side terminal device 30, as shown in FIG. 20, a dialogue asking "How many votes are allotted per participant?" is displayed, and the chairman can input an arbitrary vote number. The participant's side terminal device 20, as shown in FIG. 21, selects the problems being objects of the vote by the vote number set by the chairman and carries out voting, by the participant's operation.

When receiving the vote number from the participant's side terminal device 20 (S118), the management server 10 transmits that vote number to the chairman's side terminal device 30 and the participant's side terminal device 20 (S119).

Figure 22:
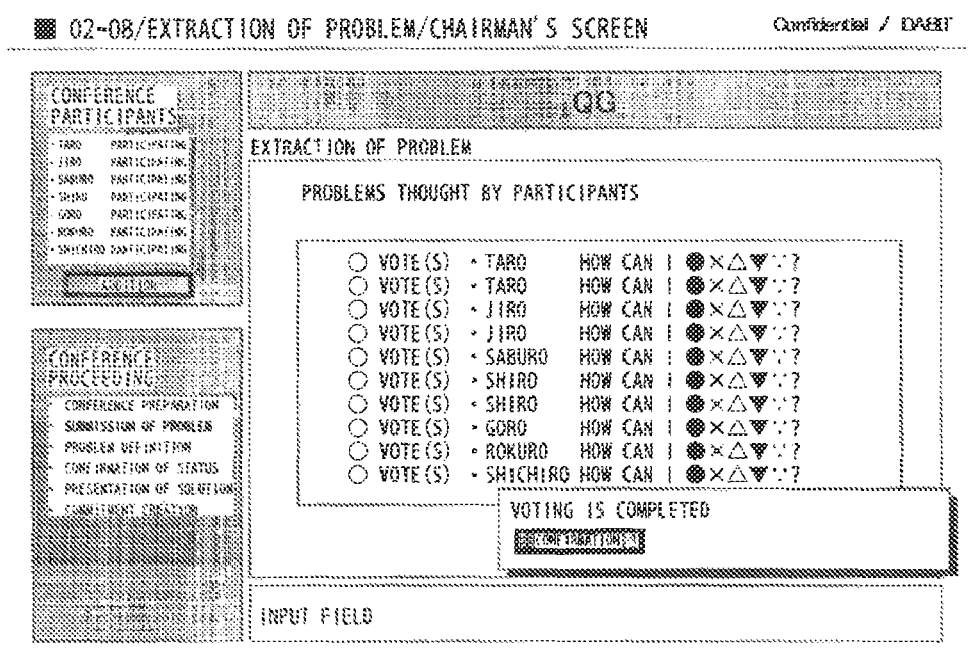
FIG. 22 is a screen of a chairman's side terminal device, and is a schematic diagram showing a vote completion screen.

On the display of the chairman's side terminal device 30, as shown in FIG. 22, a vote completion dialogue and a vote result sorted in descending order of the vote number are displayed (S120).

Similarly, on the display of the participant's side display, as shown in FIG. 23, a vote result sorted in descending order of the vote number is displayed (S121).

(Problem Solving—Confirmation Processing of Status)

Figure 8:
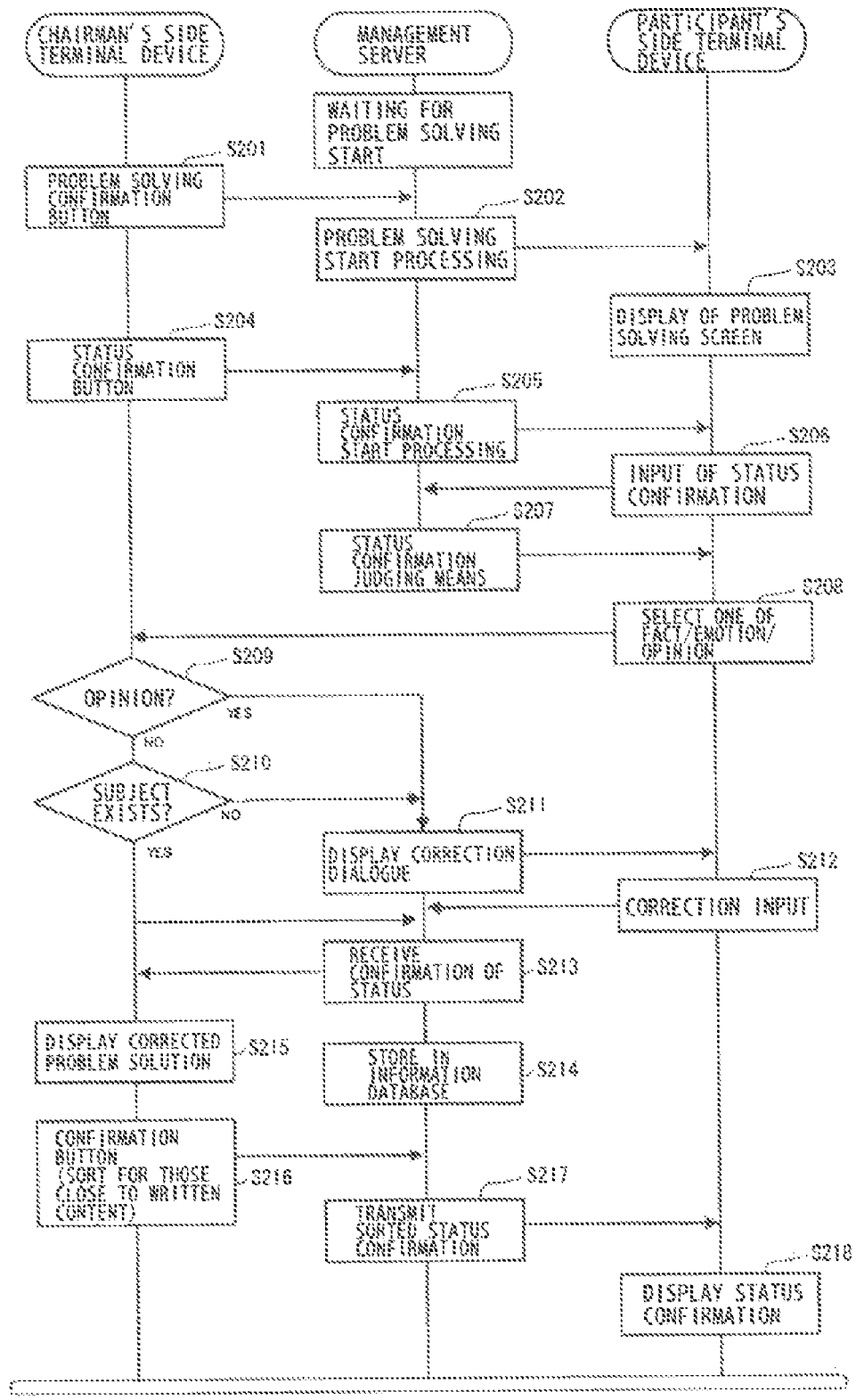
FIG. 8 is a flowchart showing processings of a teleconference system.

FIG. 8 is a flowchart showing processings from problem solving to confirmation of the status, while FIG. 24 to FIG. 32 are diagrams showing display statuses of the displays in the participant's side terminal device 20 and the chairman's side terminal device 30.

Problem solving is started by, for example, selecting the problem with the greatest number of the votes, or the like.

Figure 25:
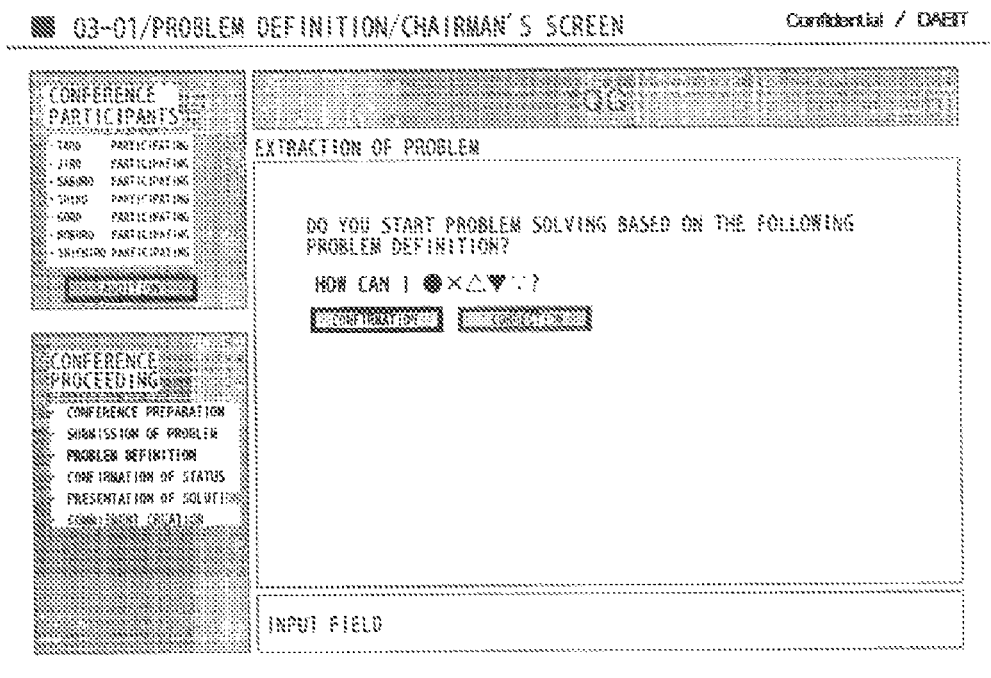
FIG. 25 is a screen of a chairman's side terminal device, and is a schematic diagram showing a problem definition.

When the chairman's side terminal device 30 selects a certain problem by the chairman's operation, as shown in FIG. 24 a dialogue asking "Do you start from the problem solving of the following?" is displayed on the display. When the chairman's side terminal device 30 clicks a confirmation button, as shown in FIG. 25, "Based on the following definition of the problem, do you start problem solving?" is displayed, and after the problem definition is confirmed, the confirmation button is clicked (S201).

The management server 10 receives a signal of the confirmation button, and carries out a problem solving start processing (S202).

Figure 26:
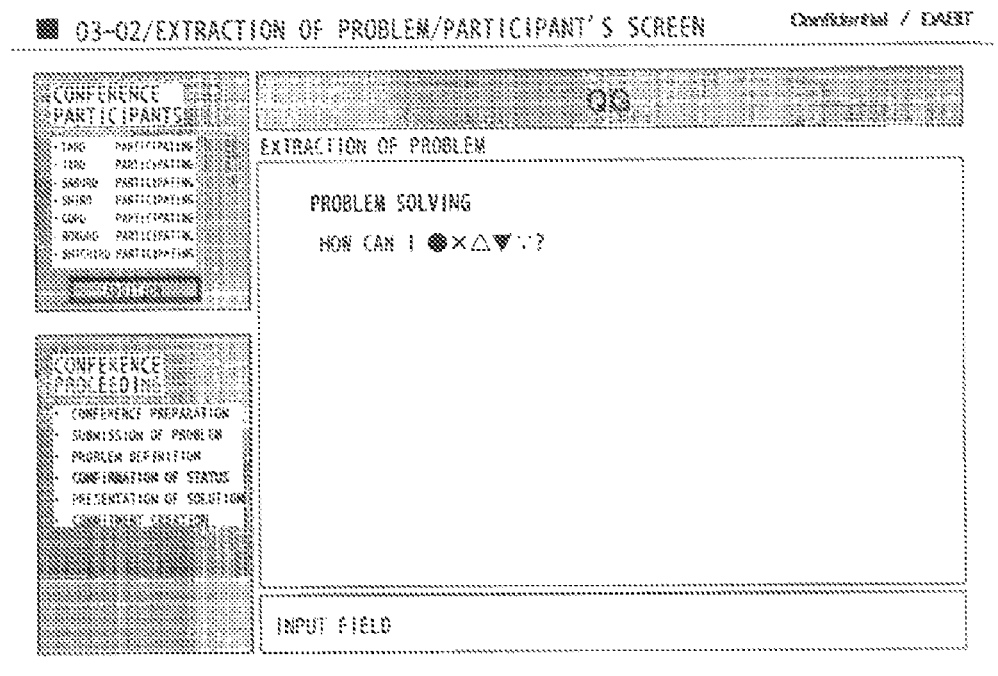
FIG. 26 is a screen of a participant's side terminal device, and is a schematic diagram showing a problem definition.

On the display of the participant's side terminal device 20, as shown in FIG. 26, a problem solving screen asking "How-?" is displayed (S203).

Figure 27:
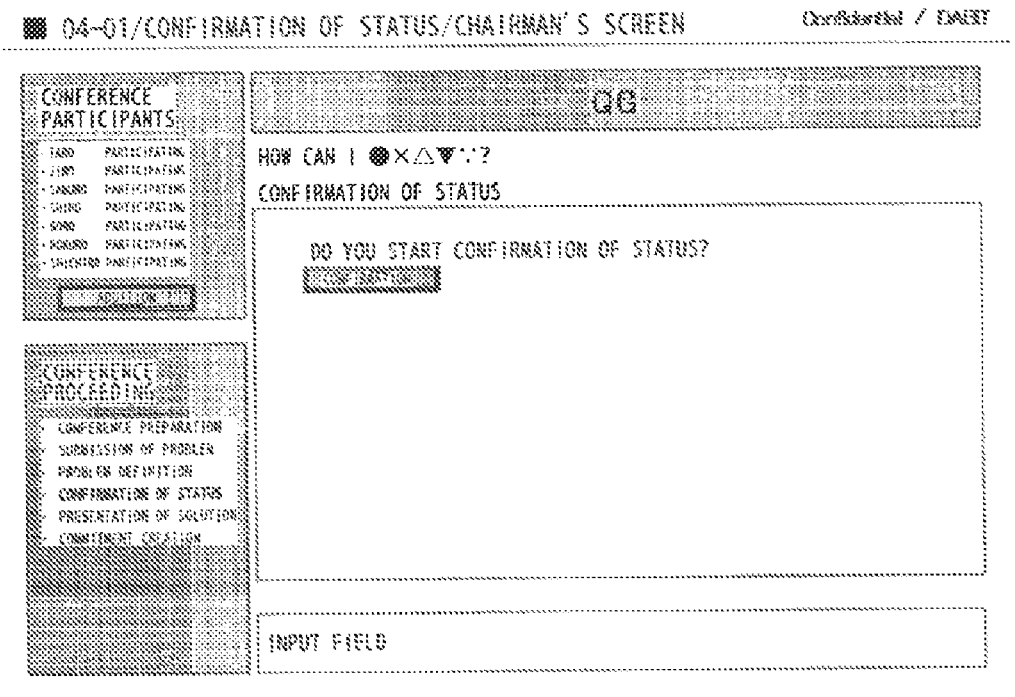
FIG. 27 is a screen of a chairman's side terminal device, and is a schematic diagram showing a dialogue of a status confirmation start processing.

Further, on the display of the chairman's side terminal device 30, as shown in FIG. 27, "Do you start confirmation of the status?" is displayed, and to start confirming the status, a status confirmation button is clicked (S204).

When receiving a signal of the status confirmation button, the management server 10 carries out a status confirmation start processing (S205).

Figure 28:
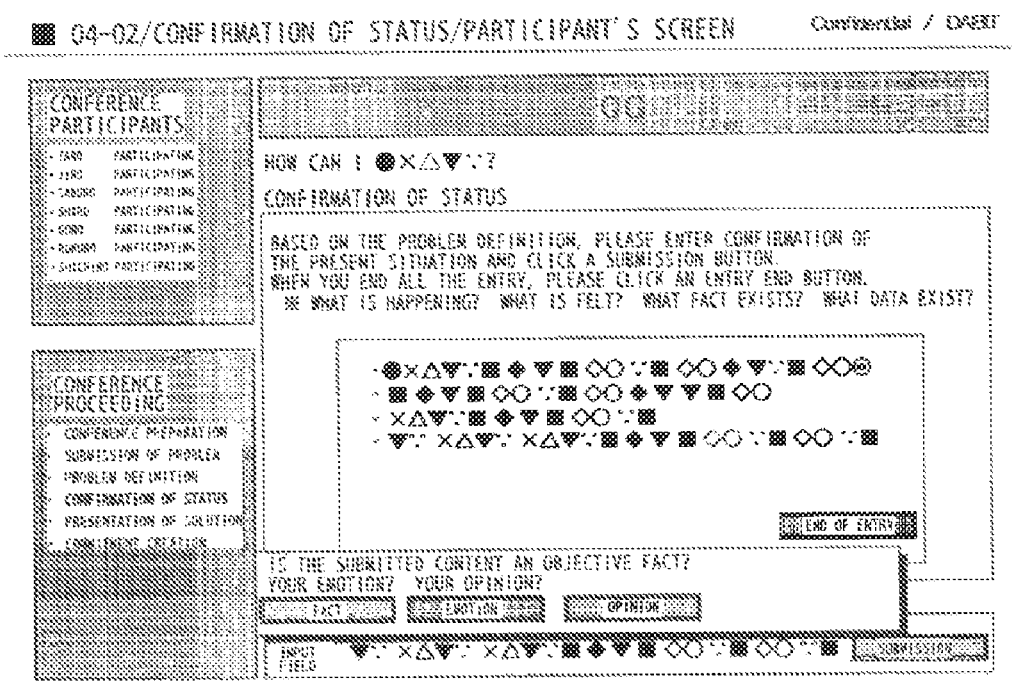
FIG. 28 is a schematic diagram showing a dialogue selection screen of a fact, an emotion, and an opinion in confirmation of a status in a participant's side terminal device.

On the display of the participant's side terminal device 20, as shown in FIG. 28, "Based on the definition of the problem, please enter confirmation of the current status and click a submission button. If you end all the entry, please press an entry end button" is displayed, and in response thereto, the participant's side terminal device 20 inputs confirmation of an appropriate status by the participant's operation (S206).

When the management server 10 receives the confirmation of the status inputted from the participant's side terminal device 20 by the participant's operation, a status confirmation judging means transmits a confirming dialogue for judging which of "fact/emotion/opinion" the confirmation of the status inputted by the participant's side terminal device 20 is (S207).

On the display of the participant's side terminal device 20, as shown in FIG. 28, a dialogue asking "Is the submitted content an objective fact, your emotion, or your opinion?" is displayed, and the appropriate one of these is selected (S208).

Figure 29:
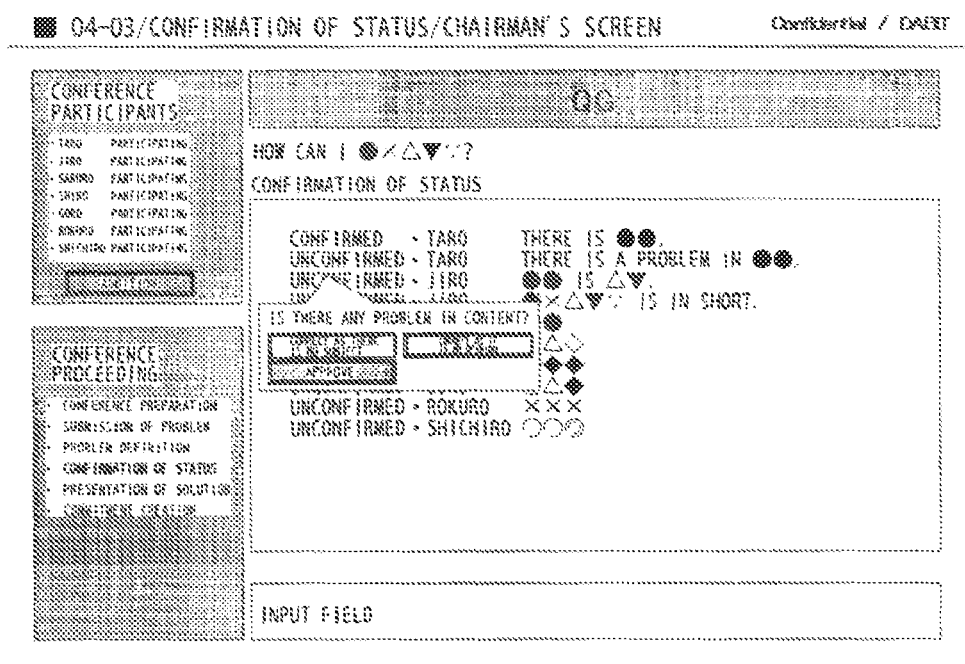
FIG. 29 is a screen of a chairman's side terminal device, and is a schematic diagram showing a dialogue to determine a processing for selections of participants.

On the other hand, the chairman's side terminal device 30 judges whether or not the selected content is a fact and an emotion (S209). Here, if the selected content is an opinion, a button telling "Correct as it is an opinion." is displayed and can be selected as shown in FIG. 29. The management server 10 makes the correcting dialogue displayed on the display of the participant's side terminal device 20 (S211), and confirms whether the content is corrected to a fact or an emotion.

Figure 30:
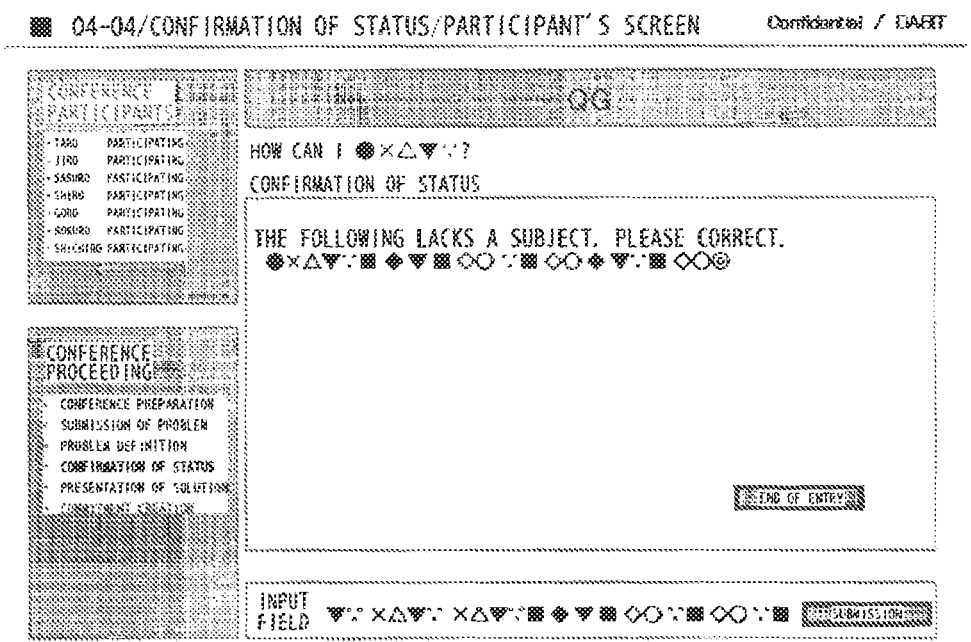
FIG. 30 is a screen of a participant's side terminal device, and is a schematic diagram showing a screen in which a correction instruction is displayed.

Meanwhile, when the selected content is judged to be a fact and an emotion, it is judged whether or not a subject exists (S210). If the subject does not exist, a button telling "Correct as there is no subject" is selected. The management server 10 makes a correcting dialogue telling "The following lacks a subject. Please correct." displayed on the display of the participant's side terminal device 20 as shown in FIG. 30 (S211).

When a correction is inputted from the participant's side terminal device 20 by the participant's operation in accordance with an instruction of the correcting dialogue (S212), the management server 10 receives the corrected and inputted problem solution as the confirmation of the statues (S213) and stores it in the information database 50 (S214).

Figure 31:
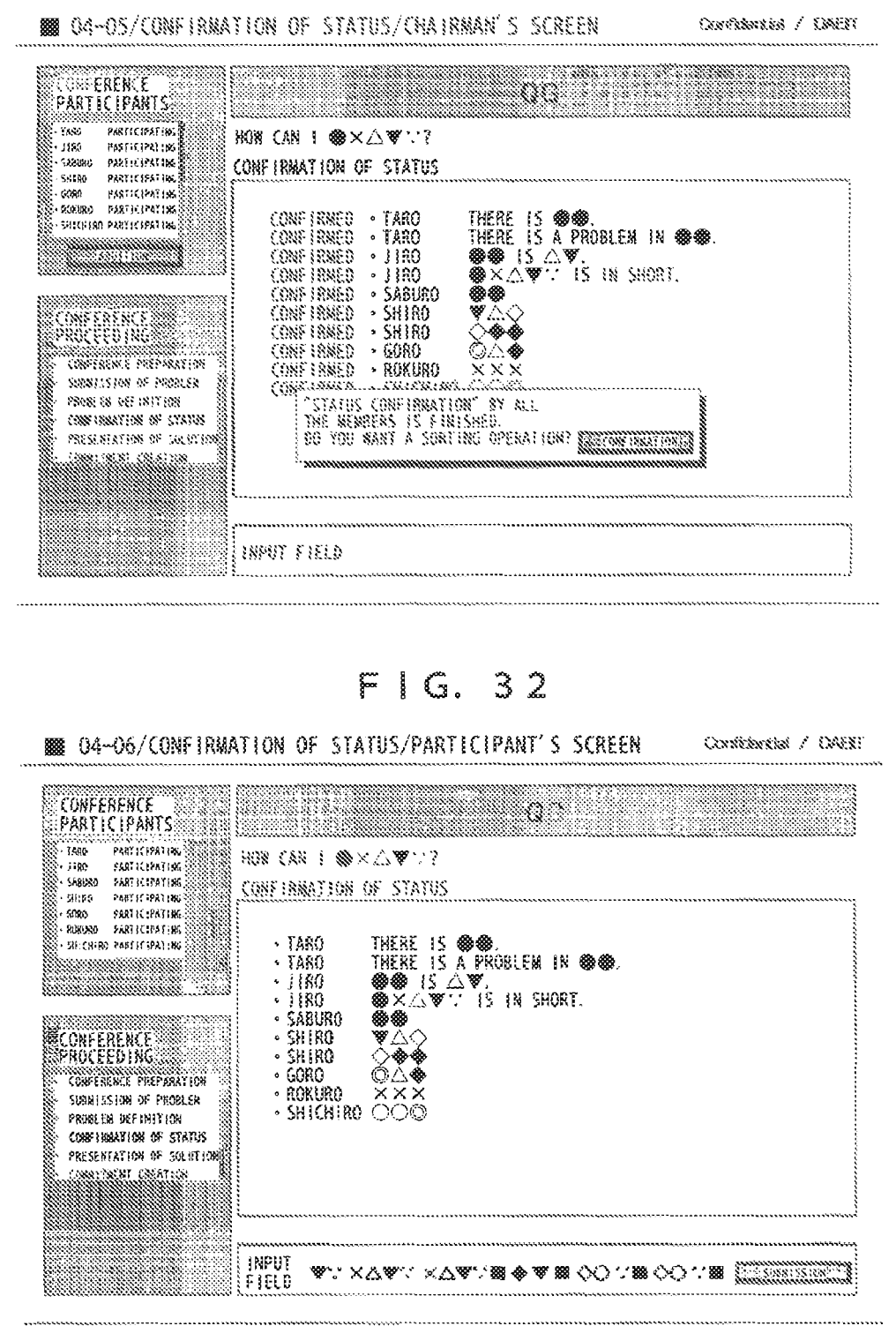

On the display of the chairman's side terminal device 30, the corrected and inputted problem solution is displayed (S215), and as shown in FIG. 31, a dialogue asking "The status confirmation of all the participants is finished. Do you want a sorting operation?" is displayed. When a confirmation button is clicked from the chairman's side terminal device 30 by the chairman's operation (S216), the management server 10 transmits the sorted status confirmation to the participant's side terminal device 20 (S217). Then, as shown in FIG. 32, the status confirmation of each participant is displayed also on the display of the participant's side terminal device 20 (S218).

(Presenting Processings of Solution)

Figure 9:
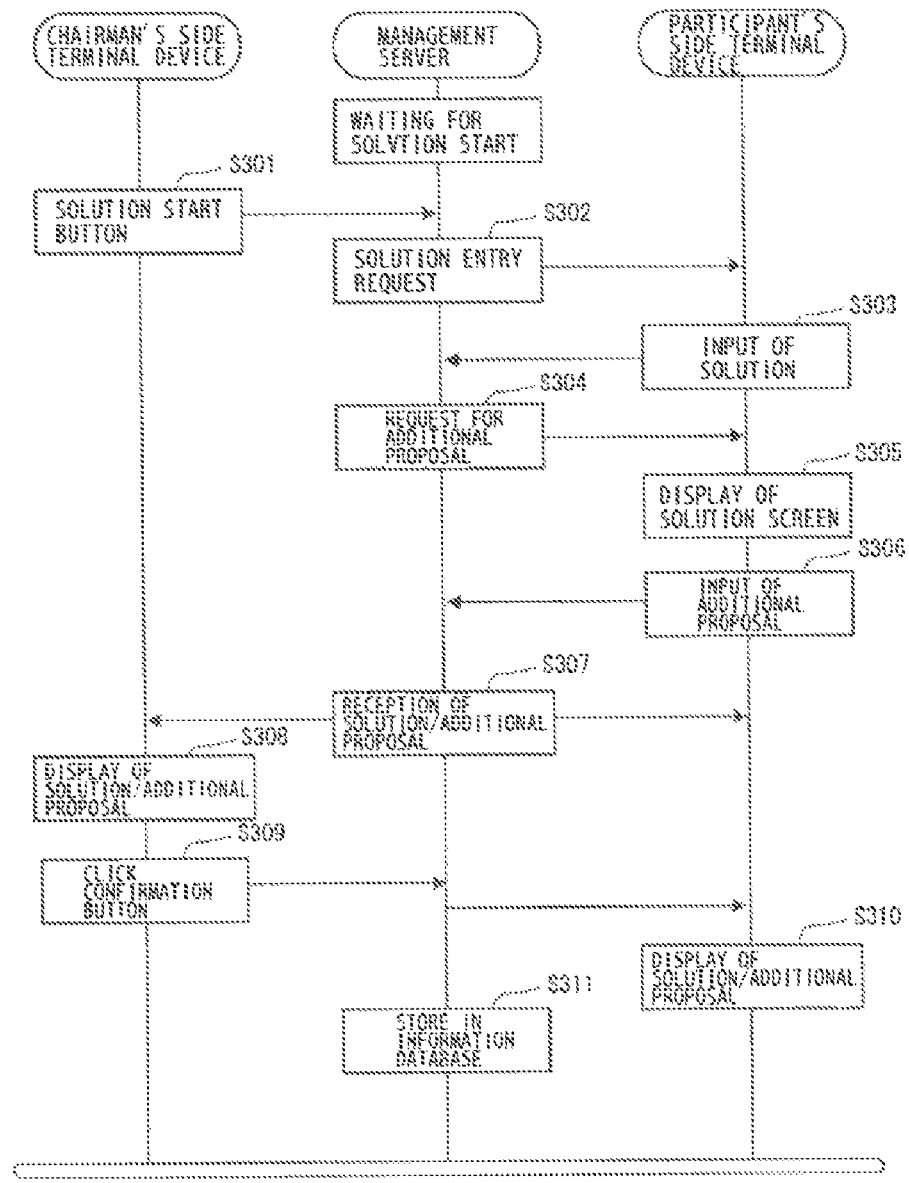
FIG. 9 is a flowchart showing processings of a teleconference system.

FIG. 9 is a flowchart showing presenting processings of solution, while FIG. 33 to FIG. 36 are diagrams showing display states of the displays in the participant's side terminal device 20 and the chairman's side terminal device 30.

Figure 33:
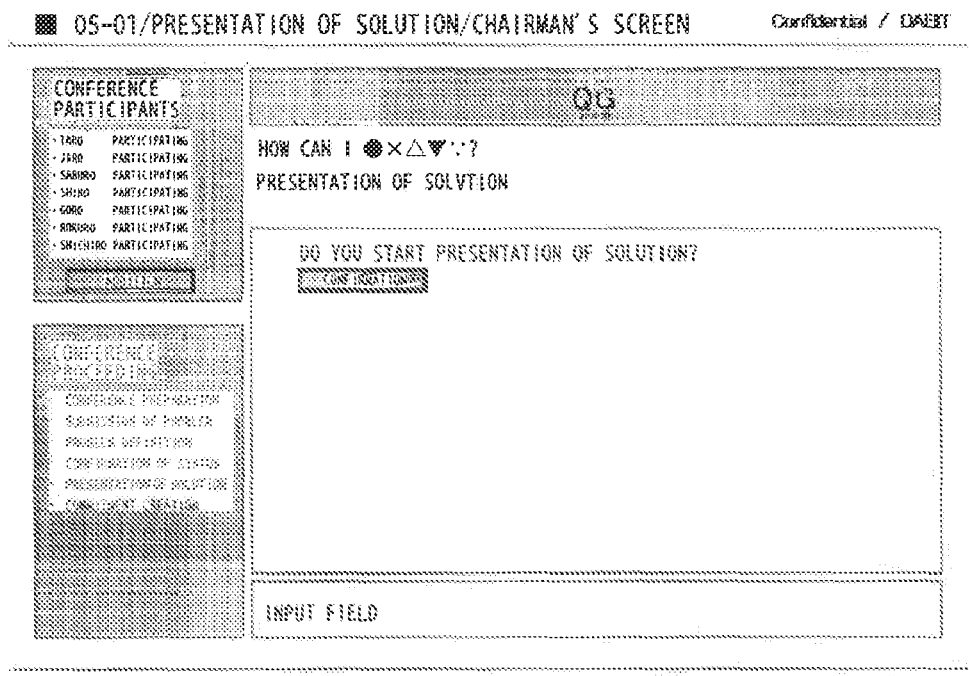
FIG. 33 is a screen of a chairman's side terminal device, and is a schematic diagram showing a screen of a solution presentation start processing.

When the confirmation of the statues is finished, as shown in FIG. 33 a dialogue asking "Do you start presentation of solutions?" is displayed on the display of the chairman's side terminal device 30. When a confirmation button is clicked from the chairman's side terminal device 30 by the chairman's operation (S301), the management server 10 receives a signal of the confirmation button and transmits a solution entry request to the participant's side terminal device 20 (S302).

In the participant's side terminal device 20, an input of the solution is carried out by the participant's operation (S303).

Meanwhile, here, an additional solution input instructing means of the management server 10 can transmit a confirming dialogue telling "Please enter two more trifling ideas" (S304).

Figure 34:
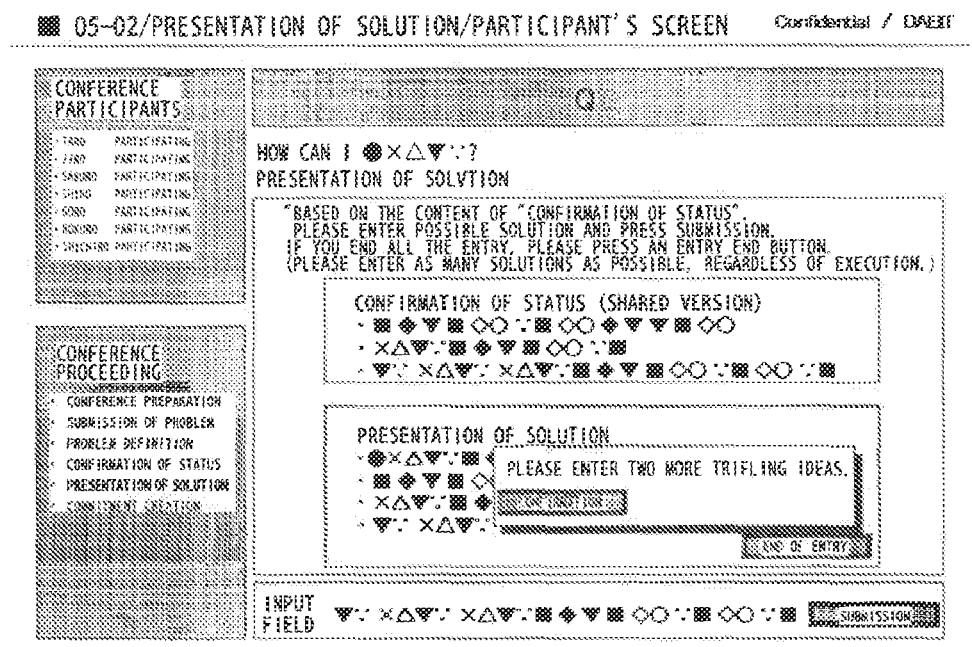
FIG. 34 is a screen of a participant's terminal device, and is a schematic diagram showing a solution input screen.

On the display of the participant's side terminal device 20, as shown in FIG. 34, a presentation screen of solution telling "Based on the content of confirmation of the status, please enter possible solutions and press submission. If you end all the entry, please press an entry end button" and a screen of an additional solution telling "Please enter two more trifling ideas" are displayed (S305).

When an additional proposal is inputted from the participant's side terminal device 20 by the participant's operation (S306), the management server 10 receives the solution and the additional proposal (S307: statement attribute data receiving means), and transmits the received solution and additional proposal to the participant's side terminal device 20 and the chairman's side terminal device 30.

Figure 35:
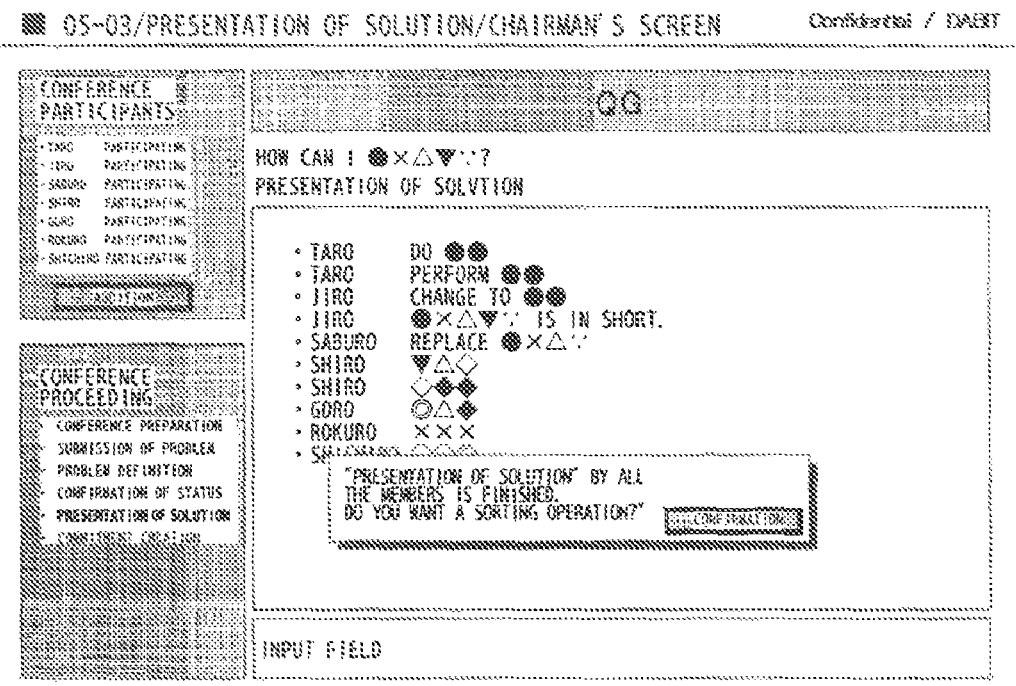
FIG. 35 is a screen of a chairman's side terminal device, and is a schematic diagram showing a completion dialogue of solution presentation by the participants.
Figure 36:
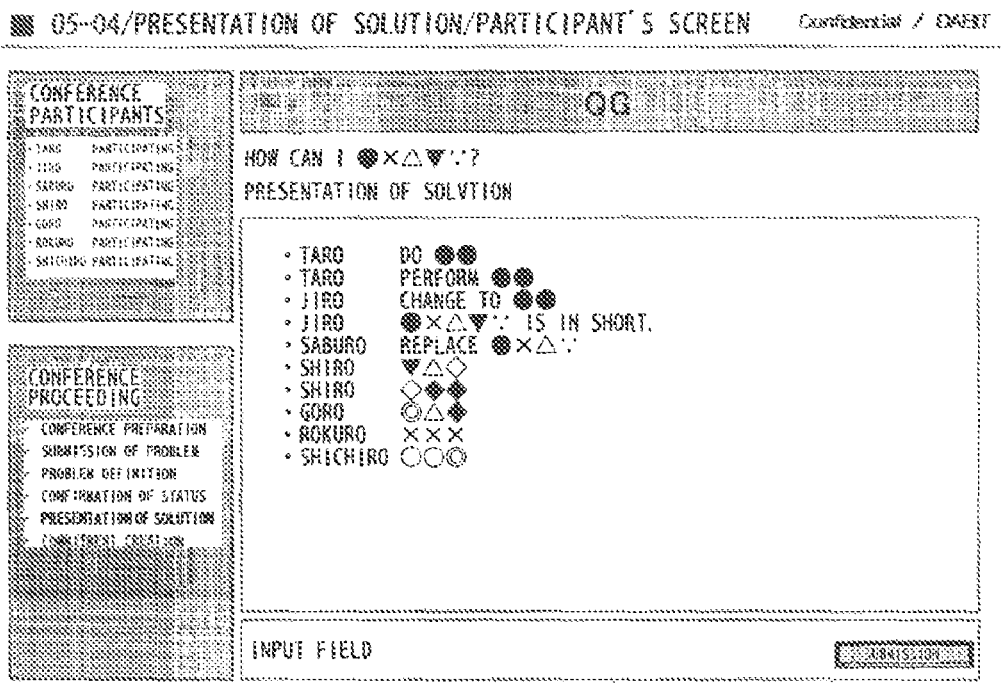
FIG. 36 is a screen of a participant's side terminal device, and is a schematic diagram showing a completion screen of solution presentation by the participants.

On the display of the chairman's side terminal device 30, as shown in FIG. 35, a dialogue asking "Solution presentation of all the participants is finished. Do you want a sorting operation?" is displayed (S308). Here, when a confirmation button is clicked by the chairman's operation to instruct (disclosure permission signal) disclosure permission of the document of the solution (309), as shown in FIG. 36 a presentation screen of the solutions accumulated in the chairman's side is displayed on the display of the participant's side terminal device 20 (S310).

Further, the management server 10 stores the solutions and the additional proposals in the information database 50 (S311).

(Commitment Creation Processings)

Figure 10:
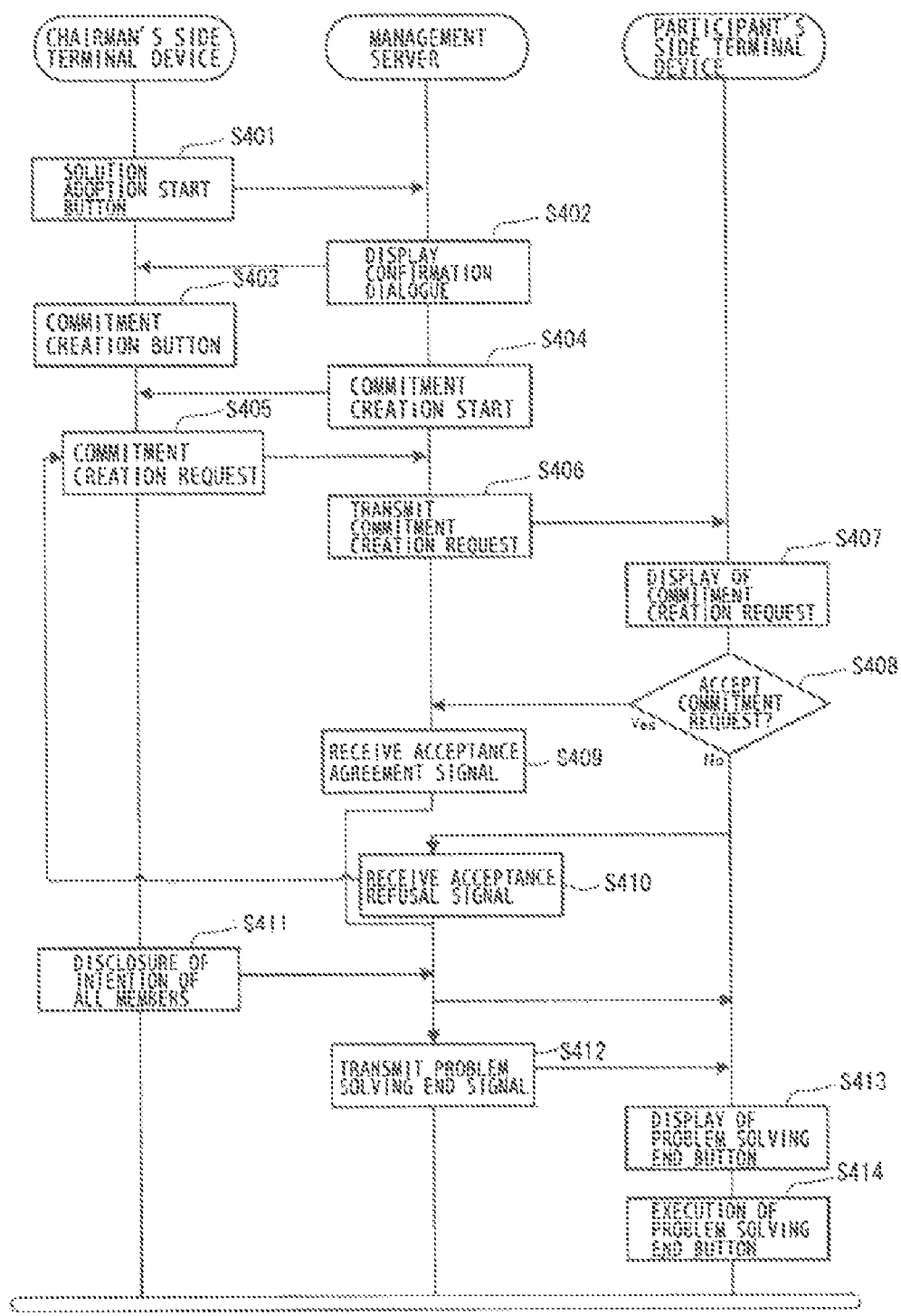
FIG. 10 is a flowchart showing processings of a teleconference system.

FIG. 10 is a flowchart showing commitment creation processings, while FIG. 37 to FIG. 42 are diagrams showing display statuses of the displays in the participant's side terminal device 20 and the chairman's side terminal device 30.

For creation of a commitment, after the presentation of the solution is carried out, as shown in FIG. 37 on the display of the chairman's side terminal device 30, a dialogue asking "Do you start adoption of solutions?" is displayed. When the chairman's side terminal device 30 clicks a confirmation button therefore by the chairman's operation (S401), the management server 10 receives a signal of the confirmation button, and executes a start processing of commitment creation (S402).

In the chairman's side terminal device 30, as shown in FIG. 38, a dialogue telling "Please select the solutions to adopt from the following list and click a commitment creation button" which is transmitted from the management server 10 is displayed, and a list of solutions of the participants is displayed. When the chairman's side terminal device 30 clicks the commitment creation button by the chairman's operation (S403), the management server 10 receives a signal thereof and starts the commitment creation processing (S404).

Figure 39:
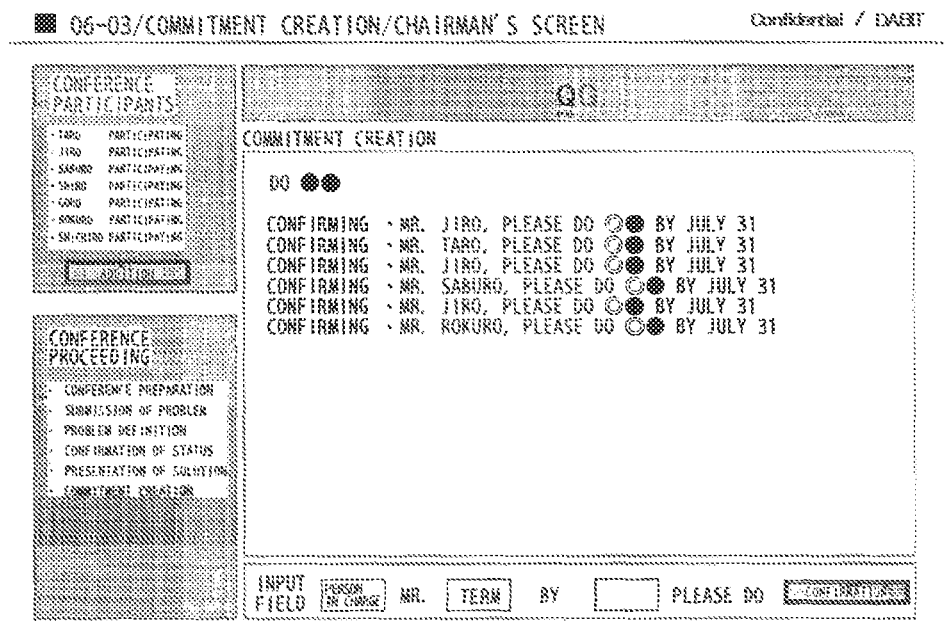
FIG. 39 is a screen of a chairman's side terminal device, and is a schematic diagram showing a screen for inputting an instruction for a participant to create a commitment.

Subsequently, on the display of the chairman's side terminal device 30, as shown in FIG. 39, input fields of "person in charge field" for selecting a person in charge of commitment creation, "time limit field" for selecting a creation time limit such as by which date and by what time, and "solution input field" for giving an instruction for carrying out the content of the adopted solution are displayed. Necessary items are inputted in the respective input fields from the chairman's side terminal device 30 by the chairman's operation, and commitment creation is requested of the participants (S405).

When receiving the creation request whose input field is filled, the management server 10 transmits creation request to the participant's side terminal device 20 as the commitment creation request (S406).

Figure 40:
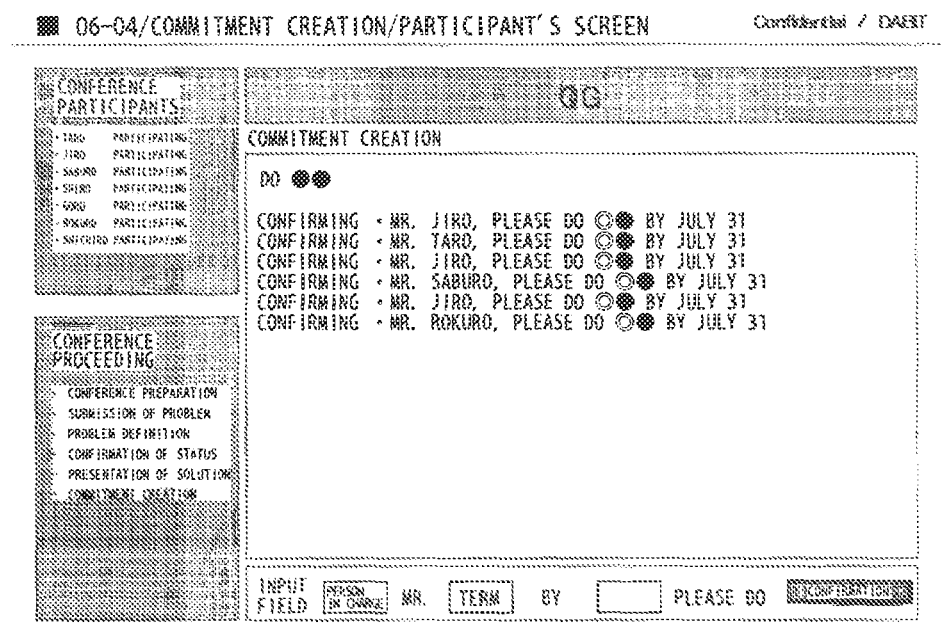
FIG. 40 is a screen of a participant's side terminal device, and is a schematic diagram showing a screen in a case that a commitment creation request is accepted.

On the display of the participant's side terminal device 20, as shown in FIG. 40, the commitment creation request inputted by the chairman's side terminal device 30 is displayed (S407).

Figures 41, 42:
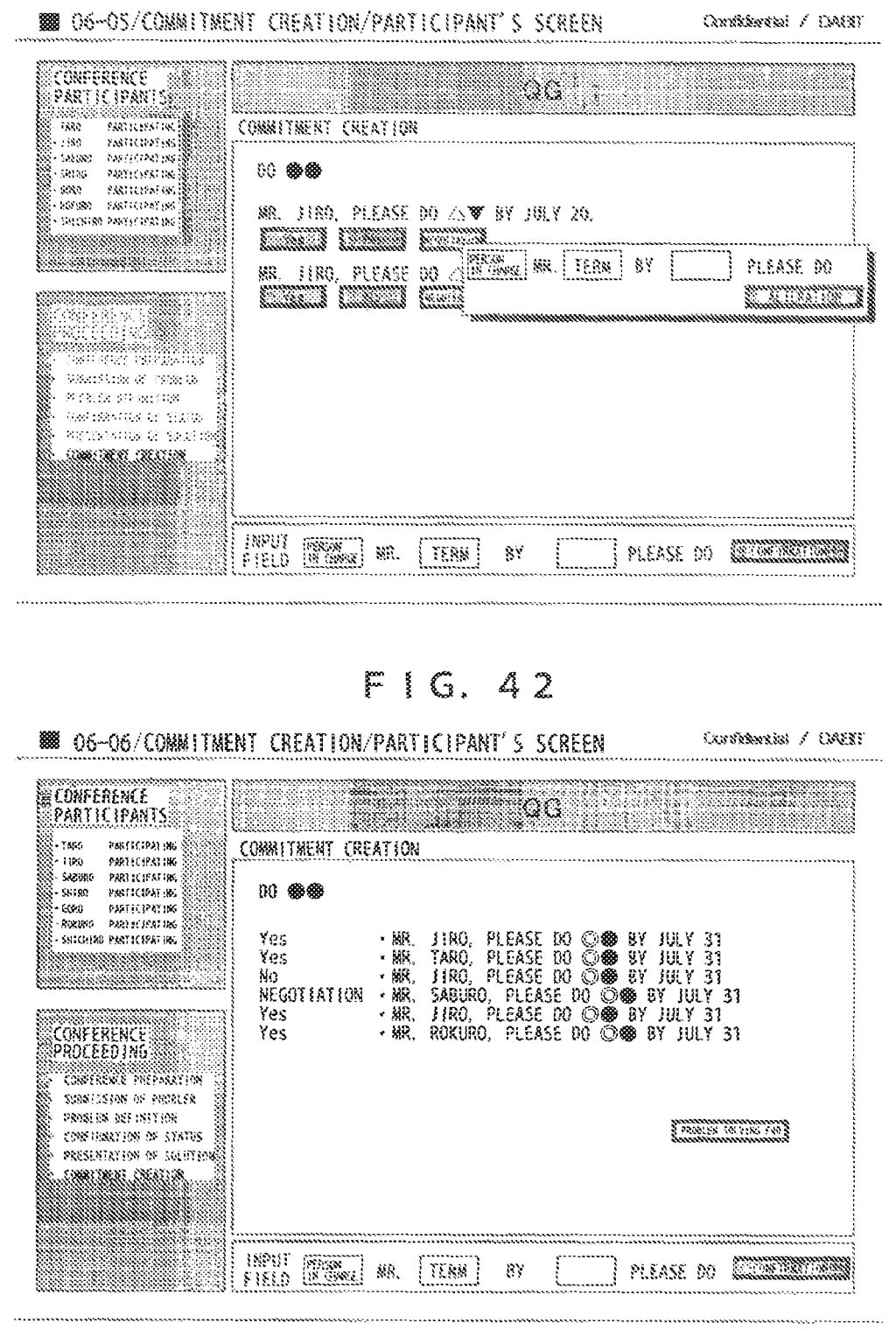

On the display of the participant's side terminal device 20 designated as the person in charge among the participants, a dialogue for giving a reply of whether or not the commitment creation request is acceptable as shown in FIG. 41 is displayed. A button of "Yes/No/Negotiation for condition" is indicated in the dialogue. As for the negotiation for condition, mainly, a parson in charge, a term, and a result (content) are negotiable. Here, the participant selects any one of "Yes/No/Negotiation for condition" (S408). When the participant accepts the commitment request, an acceptance agreement signal is transmitted to the management server 10. The management server 10 receives that acceptance agreement signal (S409).

On the other hand, when the participant refuses acceptance of the commitment request, an acceptance refusal signal is transmitted to the management server 10. The management server 10 receives that acceptance refusal signal (S410). In this case, in order to carry out the creation request of another participant, the chairman's side terminal device 30 returns to S405 and carries out the creation request of commitment again. When the request of commitment is finished between the respective participants, the chairman's side terminal device 30 executes to all the participant's side terminal devices 20 "Disclosure of intent of all participants" including whether or not the commitment is agreeable, by the chairman's operation (S411). This contributes to prevention of a future trouble or the like by recording as accessible by all the participants.

In a case that the arranged commitment has no problem, when the management server 10 receives all the signals of commitment acceptance confirmation buttons transmitted from the participant's side terminal devices 20 by the participants' operation, the management server 10 transmits end signals of problem solving to the participant's side terminal devices 20 (S412).

Then, as shown in FIG. 42, a problem solving end button is displayed on the display of the participant's side terminal device 20 (S413), and clicking that problem solving end button terminates the teleconference (S414).

Though not illustrated, termination of the teleconference can be carried out also by problem solving end confirmation and problem solving end button on the display of the chairman's side terminal device 30. In the chairman's side terminal device 30, for a dialogue asking "Do you end problem solving?", if "Yes" is selected, the termination of the teleconference is selected and there are created minutes of the meeting and a commitment list in which general-purpose spreadsheet software is used. On the other hand, if "No" is selected, the process returns to S308 and presentation of another solution is carried out again.

According to the present embodiment, creation of a commitment is possible in a proceeding stage of a teleconference, so that trouble of creating a commitment after the meeting as in an ordinary conference is unnecessary.

Further, since a plurality of terminal devices are network-connected to constitute a teleconference system, even if each participant using respective terminal devices is physically apart, participation in a teleconference is not influenced by a geographical distance and it is easy to participate in the teleconference.

Further, as a result of inputting a participant's opinion as statement information by using an input means of the terminal device or merging, grouping, choosing such statement information on a screen, meaningful exchange of opinions is performed, so that all the participants become able to commonly own information and also the conference itself can proceed smoothly.

Further, conference progress management by a chairman is greatly improved. For example, the chairman can control timing of disclosure of a conference participant's statement content to other participants so that the conference participant cannot access another participants' statement content while the conference participant is given a chance to make a statement. Thus, the conference participant is not influenced by another participant's opinion and is required to write statement content by thinking with his own head. Thereby, it becomes hard for the conference participant to participate only to imitate or criticize another participant's opinion, and the conference participant has no other choice than to actively participate.

Further, the chairman can control a statement submission time of the conference participant. By doing the above control, the conference participant is required to think and write the statement content by himself, feeling a pressure of a predetermined time. As a result, mind of each of the conference participants becomes active, so that the whole conference smoothly proceeds and the conference can be terminated in a short time.

(English Learning Function)

As stated above, in the teleconference system according to the present invention, the conference can proceed by using English.

In other words, the teleconference system has a use language selecting means for selecting a language used in the teleconference, an English conversion judging means for asking whether or not a problem inputted by an input means of a participant's side terminal device 20 is convertible into English, a spelling check judging means for judging spelling check at a time of English input, and a spelling display means for displaying a correct spelling for a spelling judged to be an incorrect spelling by the spelling check judging means in the participant's side terminal device 20.

In the English learning function, as a use language to be used in the teleconference, English is supported in addition to Japanese. By enabling use of the language other than Japanese in the conference, a Japanese participant can get training of English by way of the teleconference. Meanwhile, for a foreign participant, since English is supported, difficulty in understanding of Japanese or inputting by Japanese does not hamper participation in the teleconference.

Further, the English conversion judging means asks whether or not the problem inputted by the participant's side terminal device 20 can be converted into English. Here, if conversion into English is possible, the problem is converted into English and submitted. Converting the problem into English contributes to training of English.

Figure 43:
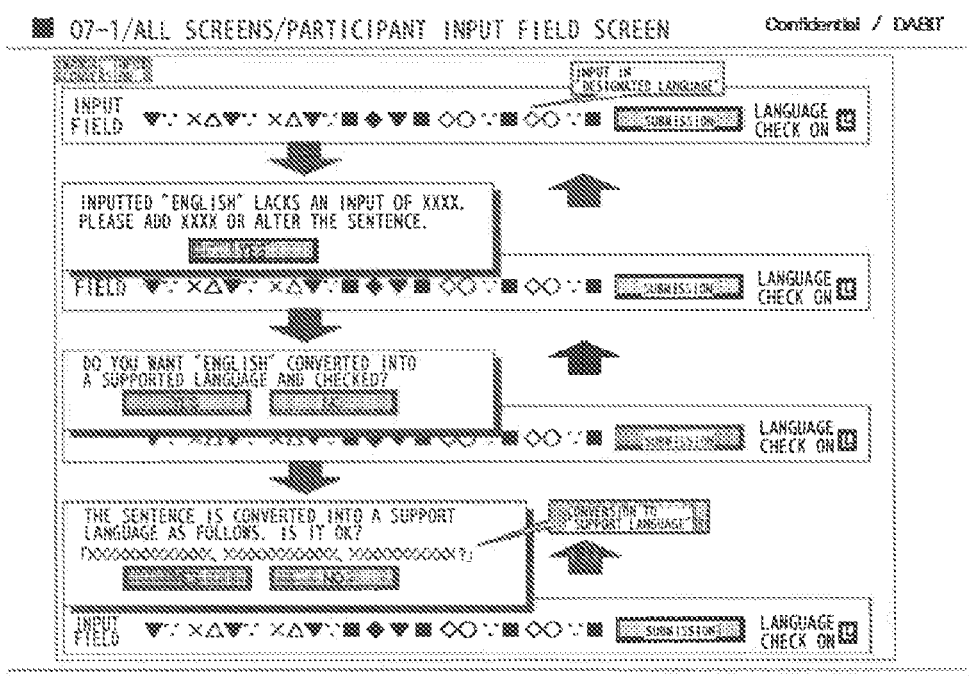
FIG. 43 is a screen of a participant's side terminal device, and is a schematic diagram showing a confirmation dialogue in a case that a conference proceeds in English.

Further, when the problem or the like is inputted in English, the spelling check judging means judges a spelling mistake. For the above, as shown in FIG. 43, there is displayed a confirming dialogue telling "The inputted English sentence lacks an input of XXXX. Please add XXXX or alter the sentence.". In other words, if it is judged that the spelling is incorrect, a correct spelling is displayed in the participant's side terminal device 20 to prompt correction. This contributes to leaning of the correct spelling through the teleconference and to improvement of English skill.

Further, as shown in FIG. 43, in converting into a support language, a confirming dialogue asking "The sentence is converted into the support language as follows. Is it OK?" is displayed. The participant's side terminal device 20 clicks a Yes button or a No button to select and determine.

It should be noted that the use language in the present embodiment is set to be English, but it is possible, as a matter of course, to support a plurality of languages such as Chinese, Korean, French, Spanish, German,. and Italy.

Industrial Availability

It is possible to provide the present invention as a software business to sell a computer program for a teleconference system, a sales business to sell a computer program as a preinstalled hardware system, a rental business to provide the system for rent, and an ASP (application service provider) business to provide a function of a teleconference system via a network.

The invention claimed is:

1. A management server for teleconference system network-connected by a plurality of terminal devices participating in a teleconference and enabling information related to the teleconference to be displayed in each terminal device, the management server comprising:
 a statement information receiving means for receiving statement information such as a problem concerning an agenda and a solution for that problem which are inputted from an input means of the terminal device;
 a statement information accumulating means for once accumulating the statement information received by said statement information receiving means without displaying the statement information in the terminal device of a participant temporarily;
 a statement information transmitting means for transmitting the statement information to all the terminal devices participating in the teleconference, when in accordance with a judgment of a chairman leading the teleconference an input means of the chairman's side terminal device of the chairman transmits a disclosure permission signal of the accumulated statement information;
 a statement attribute data receiving means for receiving statement attribute data from the statement information created by a certain participant's operation in each terminal device having received the statement information;
 an information database storing the statement attribute data received by said statement attribute data receiving means and the statement information; and
 a commitment generating means for generating a commitment related to the teleconference, based on the statement attribute data and the statement information stored in said information database.

2. The management server for teleconference system according to claim 1, wherein
 said commitment generating means comprises a commitment creation request transmitting means for selecting a solution adopted as a commitment among solutions for the problem inputted by the input means of the terminal device and for requesting creation of the commitment of the terminal device having proposed the selected solution for the problem.

3. The management server for teleconference system according to claim 1, comprising:
 a questioning format transmitting means for receiving the problem inputted by the input means of the terminal device, and for converting the inputted problem into a predetermined questioning format to enable the terminal device to create a questioning document by using that questioning format.

4. The management server for teleconference system according to claim 3, comprising:
 a problem solution data receiving means for receiving problem solution data for solving the problem converted into the questioning format from the terminal device;
 a status confirmation judging means for judging which of a fact, an emotion and an opinion the received problem solution data is; and
 a correction input confirming means for asking whether to correct to the fact or the emotion when the problem solution data is judged to be the opinion by said status confirmation judging means.

5. The management server for teleconference system according to claim 1, comprising:
 a solution data receiving means for receiving solution data proposed as a solution for the problem from the terminal device; and
 an additional solution input instructing means for instructing the terminal device to propose an additional solution different from the solution data.

6. The management server for teleconference system according to claim 1, comprising:
 a use language selecting means for enabling selection of a use language of the teleconference, wherein
 the usable language includes at least English.

7. The management server for teleconference system according to claim 6, comprising:
 a multilingual conversion judging means for asking whether or not the problem inputted by the input means of the terminal device is convertible into multiple languages.

8. The management server for teleconference system according to claim 7, comprising:
 a spelling check judging means for judging spelling check at a time of multilingual input; and
 a spelling displaying means for displaying in the terminal device a correct spelling for the spelling judged to be an incorrect spelling by said spelling check judging means.

9. A computer program network-connected by a plurality of terminal devices participating in a teleconference and enabling information related to the teleconference to be displayed in each respective terminal device, the computer program configured to cause a computer to realize:
 a statement information receiving step for receiving statement information such as a problem concerning an agenda and a solution for the problem which are inputted from an input means of the terminal device;
 a statement information accumulating step for once accumulating the statement information received by said statement information receiving step without displaying the statement information in the terminal device of a participant temporarily;
 a statement information transmitting step for transmitting the statement information to all the terminal devices participating in the teleconference, when in accordance with a judgment of a chairman leading the teleconference an input means of the chairman's side terminal device of the chairman transmits a disclosure permission signal of the accumulated statement information;
 a statement attribute data receiving step for receiving statement attribute data from the statement information created by a certain participant's operation in each terminal device having received the statement information;

a storing step for storing the statement attribute data received by said statement attribute data receiving step and the statement information in an information database; and a commitment generating step for generating a commitment related to the teleconference, based on the statement attribute data and the statement information stored in the information database.

10. The computer program according to claim 9, wherein said commitment generating step comprises a commitment creation request transmitting step for selecting a solution adopted as a commitment among solutions for the problem inputted by the input means of the terminal device and for requesting creation of the commitment of the terminal device having proposed the selected solution for the problem.

11. The computer program according to claim 9, comprising:
a questioning format transmitting step for receiving the problem inputted by the input means of the terminal device, and for converting the inputted problem into a predetermined questioning format to enable the terminal device to create a questioning document by using that questioning format.

12. The computer program according to claim 11, comprising:
a problem solution data receiving step for receiving problem solution data for solving the problem converted into the questioning format from the terminal device;
a status confirmation judging step for judging which of a fact, an emotion and an opinion the received problem solution data is; and
a correction input confirming step for asking whether to correct to the fact or the emotion when the problem solution data is judged to be the opinion by said status confirmation judging step.

13. The computer program according to claim 9, comprising:
a solution data receiving step for receiving solution data proposed as a solution for the problem from the terminal device; and
an additional solution input instructing step for instructing the terminal device to propose an additional solution different from the solution data.

14. The computer program according to claim 9, comprising:
a use language selecting step for enabling selection of a use language of the teleconference, wherein
the usable language includes at least English.

15. The computer program according to claim 14, comprising:
a multilingual conversion judging step for asking whether or not the problem inputted by the input means of the terminal device is convertible to multiple languages.

16. The computer program according to claim 15, comprising:
a spelling check judging step for judging spelling check at a time of multilingual input; and
a spelling displaying step for displaying in the terminal device a correct spelling for the spelling judged to be an incorrect spelling by said spelling check judging step.

* * * * *